(12) United States Patent
Hyde et al.

(10) Patent No.: US 8,603,598 B2
(45) Date of Patent: Dec. 10, 2013

(54) MULTI-LAYER INSULATION COMPOSITE MATERIAL HAVING AT LEAST ONE THERMALLY-REFLECTIVE LAYER WITH THROUGH OPENINGS, STORAGE CONTAINER USING THE SAME, AND RELATED METHODS

(75) Inventors: Roderick A. Hyde, Redmond, WA (US); Muriel Y. Ishikawa, Livermore, CA (US); Jordin T. Kare, Seattle, WA (US); Lowell L. Wood, Jr., Bellevue, WA (US)

(73) Assignee: Tokitae LLC, Bellevue, WA (US)

( * ) Notice: Subject to any disclaimer, the term of this patent is extended or adjusted under 35 U.S.C. 154(b) by 1304 days.

(21) Appl. No.: 12/220,439

(22) Filed: Jul. 23, 2008

(65) Prior Publication Data

US 2010/0018981 A1 Jan. 28, 2010

(51) Int. Cl.
*B32B 1/02* (2006.01)
*B65D 81/38* (2006.01)
*B32B 3/10* (2006.01)

(52) U.S. Cl.
USPC ............... 428/35.7; 428/136; 220/592.26

(58) Field of Classification Search
USPC ........ 428/35.7, 136–138, 120, 69; 220/592.2, 220/592.21, 592.26
See application file for complete search history.

(56) References Cited

U.S. PATENT DOCUMENTS

| | | | |
|---|---|---|---|
| 520,584 | A | 5/1894 | Turner |
| 2,161,295 | A | 6/1939 | Hirschberg |
| 2,717,937 | A | 9/1955 | Lehr et al. |
| 3,034,845 | A | 5/1962 | Haumann |
| 3,069,045 | A | 12/1962 | Haumann et al. |
| 3,921,844 | A | 11/1975 | Walles |
| 4,034,129 | A * | 7/1977 | Kittle ........................ 427/162 |
| 4,094,127 | A | 6/1978 | Romagnoli |
| 4,184,601 | A | 1/1980 | Stewart et al. |
| 4,312,669 | A | 1/1982 | Boffito et al. |
| 4,358,490 | A | 11/1982 | Nagai |
| 4,388,051 | A | 6/1983 | Dresler et al. |

(Continued)

FOREIGN PATENT DOCUMENTS

| | | |
|---|---|---|
| CN | 2414742 Y | 1/2001 |
| CN | 2460457 Y | 11/2001 |
| CN | 1756912 A | 4/2006 |
| CN | 101073524 A | 11/2007 |
| FR | 2 621 685 | 10/1987 |
| GB | 2 441 636 A | 3/2008 |
| WO | WO 94/15034 | 7/1994 |
| WO | WO 99/36725 A1 | 7/1999 |
| WO | WO 2007/039553 A2 | 4/2007 |

OTHER PUBLICATIONS

Bapat, S. L. et al.; "Experimental investigations of multilayer insulation"; *Cryogenics*; Bearing a date of Aug. 1990; pp. 711-719; vol. 30.

(Continued)

*Primary Examiner* — Erik Kashnikow
(74) *Attorney, Agent, or Firm* — Dorsey & Whitney LLP

(57) ABSTRACT

In an embodiment, a multi-layer insulation (MLI) composite material includes a first thermally-reflective layer and a second thermally-reflective layer spaced from the first thermally-reflective layer. At least one of the first or second thermally-reflective layers includes a plurality of through openings configured to at least partially obstruct transmission therethrough of infrared electromagnetic radiation having a wavelength greater than a threshold wavelength. A region between the first and second thermally-reflective layers impedes heat conduction between the first and second thermally-reflective layers. Other embodiments include a storage container including a container structure that may be at least partially formed from such MLI composite materials, and methods of using such MLI composite materials.

32 Claims, 11 Drawing Sheets

(56) References Cited

U.S. PATENT DOCUMENTS

| | | | |
|---|---|---|---|
| 4,402,927 A | 9/1983 | Von Dardel et al. | |
| 4,526,015 A | 7/1985 | Laskaris | |
| 4,726,974 A | 2/1988 | Nowobilski et al. | |
| 4,796,432 A | 1/1989 | Fixsen et al. | |
| 4,955,204 A | 9/1990 | Pehl et al. | |
| 4,956,976 A | 9/1990 | Kral et al. | |
| 5,012,102 A | 4/1991 | Gowlett | |
| 5,103,337 A | 4/1992 | Schrenk et al. | |
| 5,116,105 A | 5/1992 | Hong | |
| 5,277,959 A * | 1/1994 | Kourtides et al. | 428/116 |
| 5,330,816 A | 7/1994 | Rusek, Jr. | |
| 5,355,684 A | 10/1994 | Guice | |
| 5,376,184 A | 12/1994 | Aspden | |
| 5,452,565 A | 9/1995 | Blom et al. | |
| 5,548,116 A | 8/1996 | Pandelisev | |
| 5,563,182 A | 10/1996 | Epstein et al. | |
| 5,580,522 A | 12/1996 | Leonard et al. | |
| 5,590,054 A | 12/1996 | McIntosh | |
| 5,633,077 A | 5/1997 | Olinger | |
| 5,679,412 A | 10/1997 | Kuehnle et al. | |
| 5,782,344 A | 7/1998 | Edwards et al. | |
| 5,800,905 A | 9/1998 | Sheridan et al. | |
| 5,846,224 A | 12/1998 | Sword et al. | |
| 5,857,778 A | 1/1999 | Ells | |
| 6,030,580 A | 2/2000 | Raasch et al. | |
| 6,209,343 B1 | 4/2001 | Owen | |
| 6,212,904 B1 | 4/2001 | Arkharov et al. | |
| 6,213,339 B1 | 4/2001 | Lee | |
| 6,234,341 B1 | 5/2001 | Tattam | |
| 6,272,679 B1 | 8/2001 | Norin | |
| 6,287,652 B2 | 9/2001 | Speckhals et al. | |
| 6,438,992 B1 | 8/2002 | Smith et al. | |
| 6,485,805 B1 | 11/2002 | Smith et al. | |
| 6,521,077 B1 | 2/2003 | McGivern et al. | |
| 6,571,971 B1 | 6/2003 | Weiler | |
| 6,584,797 B1 | 7/2003 | Smith et al. | |
| 6,673,594 B1 | 1/2004 | Owen et al. | |
| 6,688,132 B2 | 2/2004 | Smith et al. | |
| 6,692,695 B1 | 2/2004 | Bronshtein et al. | |
| 6,701,724 B2 | 3/2004 | Smith et al. | |
| 6,742,673 B2 | 6/2004 | Credle, Jr. et al. | |
| 6,751,963 B2 | 6/2004 | Navedo et al. | |
| 6,771,183 B2 | 8/2004 | Hunter | |
| 6,813,330 B1 | 11/2004 | Barker et al. | |
| 6,841,917 B2 | 1/2005 | Potter | |
| 6,877,504 B2 | 4/2005 | Schreff et al. | |
| 6,967,051 B1 | 11/2005 | Augustynowicz et al. | |
| 7,240,513 B1 | 7/2007 | Conforti | |
| 7,253,788 B2 | 8/2007 | Choi et al. | |
| 7,258,247 B2 | 8/2007 | Marquez | |
| 7,267,795 B2 | 9/2007 | Ammann et al. | |
| 7,278,278 B2 | 10/2007 | Wowk et al. | |
| 7,596,957 B2 | 10/2009 | Fuhr et al. | |
| 7,807,242 B2 | 10/2010 | Soerensen et al. | |
| 7,982,673 B2 | 7/2011 | Orton et al. | |
| 2002/0050514 A1 | 5/2002 | Schein | |
| 2002/0083717 A1 | 7/2002 | Mullens et al. | |
| 2002/0084235 A1 | 7/2002 | Lake | |
| 2002/0130131 A1 | 9/2002 | Zucker et al. | |
| 2003/0039446 A1 | 2/2003 | Hutchinson et al. | |
| 2003/0072687 A1 | 4/2003 | Nehring et al. | |
| 2003/0148773 A1 | 8/2003 | Spriestersbach et al. | |
| 2004/0035120 A1 | 2/2004 | Brunnhofer | |
| 2004/0055313 A1 | 3/2004 | Navedo et al. | |
| 2004/0055600 A1 | 3/2004 | Izuchukwu et al. | |
| 2004/0103302 A1 | 5/2004 | Yoshimura et al. | |
| 2005/0009192 A1 | 1/2005 | Page | |
| 2005/0067441 A1 | 3/2005 | Alley | |
| 2005/0143787 A1 | 6/2005 | Boveja et al. | |
| 2005/0247312 A1 | 11/2005 | Davies | |
| 2005/0274378 A1 | 12/2005 | Bonney et al. | |
| 2006/0021355 A1 | 2/2006 | Boesel et al. | |
| 2006/0071585 A1 | 4/2006 | Wang | |
| 2006/0150662 A1 | 7/2006 | Lee et al. | |
| 2006/0191282 A1 | 8/2006 | Sekiya et al. | |
| 2006/0196876 A1 | 9/2006 | Rohwer | |
| 2006/0259188 A1 | 11/2006 | Berg | |
| 2007/0041814 A1 | 2/2007 | Lowe | |
| 2008/0164265 A1 | 7/2008 | Conforti | |
| 2008/0184719 A1 | 8/2008 | Lowenstein | |
| 2008/0233391 A1 | 9/2008 | Sterzel et al. | |
| 2008/0269676 A1 | 10/2008 | Bieberich et al. | |
| 2008/0272131 A1 | 11/2008 | Roberts et al. | |
| 2009/0275478 A1 | 11/2009 | Atkins et al. | |
| 2009/0301125 A1 | 12/2009 | Myles et al. | |
| 2010/0016168 A1 | 1/2010 | Atkins et al. | |
| 2010/0028214 A1 | 2/2010 | Howard et al. | |
| 2010/0287963 A1 | 11/2010 | Billen et al. | |
| 2011/0117538 A1 | 5/2011 | Niazi | |

OTHER PUBLICATIONS

Bapat, S. L. et al.; "Performance prediction of multilayer insulation"; *Cryogenics*; Bearing a date of Aug. 1990; pp. 700-710; vol. 30.

Barth, W. et al.; "Experimental investigations of superinsulation models equipped with carbon paper"; *Cryogenics*; Bearing a date of May 1988; pp. 317-320; vol. 28.

Barth, W. et al.; "Test results for a high quality industrial superinsulation"; *Cryogenics*; Bearing a date of Sep. 1988; pp. 607-609; vol. 28.

Benvenuti, C. et al.; "Obtention of pressures in the $10^{-14}$ torr range by means of a Zr V Fe non evaporable getter"; *Vacuum*; Bearing a date of 1993; pp. 511-513; vol. 44; No. 5-7; Pergamon Press Ltd.

Benvenuti, C.; "Decreasing surface outgassing by thin film getter coatings"; *Vacuum*; Bearing a date of 1998; pp. 57-63; vol. 50; No. 1-2; Elsevier Science Ltd.

Benvenuti, C.; "Nonevaporable getter films for ultrahigh vacuum applications"; *Journal of Vacuum Science Technology A Vacuum Surfaces, and Films*; Bearing a date of Jan./Feb. 1998; pp. 148-154; vol. 16; No. 1; American Chemical Society.

Berman, A.; "Water vapor in vacuum systems"; *Vacuum*; Bearing a date of 1996; pp. 327-332; vol. 47; No. 4; Elsevier Science Ltd.

Bernardini, M. et al.; "Air bake-out to reduce hydrogen outgassing from stainless steel"; *Journal of Vacuum Science Technology*; Bearing a date of Jan./Feb. 1998; pp. 188-193; vol. 16; No. 1; American Chemical Society.

Bo, H. et al.; "Tetradecane and hexadecane binary mixtures as phase change materials (PCMs) for cool storage in district cooling systems"; *Energy*; Bearing a date of 1999; vol. 24; pp. 1015-1028; Elsevier Science Ltd.

Boffito, C. et al.; "A nonevaporable low temperature activatable getter material"; *Journal of Vacuum Science Technology*; Bearing a date of Apr. 1981; pp. 1117-1120; vol. 18; No. 3; American Vacuum Society.

Brown, R.D.; "Outgassing of epoxy resins in vacumm."; *Vacuum*; Bearing a date of 1967; pp. 25-28; vol. 17; No. 9; Pergamon Press Ltd.

Burns, H. D.; "Outgassing Test for Non-metallic Materials Associated with Sensitive Optical Surfaces in a Space Environment"; MSFC-SPEC-1443; Bearing a date of Oct. 1987; pp. 1-10.

Chen, G. et al.; "Performance of multilayer insulation with slotted shield"; *Cryogenics ICEC Supplement*; Bearing a date of 1994; pp. 381-384; vol. 34.

Chen, J. R. et al.; "An aluminum vacuum chamber for the bending magnet of the SRRC synchrotron light source"; *Vacuum*; Bearing a date of 1990; pp. 2079-2081; vol. 41; No. 7-9; Pergamon Press PLC.

Chen, J. R. et al.; "Outgassing behavior of A6063-EX aluminum alloy and SUS 304 stainless steel"; *Journal of Vacuum Science Technology*; Bearing a date of Nov./Dec. 1987; pp. 3422-3424; vol. 5; No. 6; American Vacuum Society.

Chen, J. R. et al.; "Outgassing behavior on aluminum surfaces: Water in vacuum systems"; *Journal of Vacuum Science Technology*; Bearing a date of Jul./Aug. 1994; pp. 1750-1754; vol. 12; No. 4; American Vacuum Society.

Chen, J. R. et al.; "Thermal outgassing from aluminum alloy vacuum chambers"; *Journal of Vacuum Science Technology*; Bearing a date of Nov./Dec. 1985; pp. 2188-2191; vol. 3; No. 6; American Vacuum Society.

Chen, J. R.; "A comparison of outgassing rate of 304 stainless steel and A6063-EX aluminum alloy vacuum chamber after filling with

(56) References Cited

OTHER PUBLICATIONS water"; *Journal of Vacuum Science Technology A Vacuum Surfaces and Film*; Bearing a date of Mar. 1987; pp. 262-264; vol. 5; No. 2; American Chemical Society.

Chiggiato, P.; "Production of extreme high vacuum with non evaporable getters" *Physica Scripta*; Bearing a date of 1997; pp. 9-13; vol. T71.

Cho, B.; "Creation of extreme high vacuum with a turbomolecular pumping system: A baking approach"; *Journal of Vacuum Science Technology*; Bearing a date of Jul./Aug. 1995; pp. 2228-2232; vol. 13; No. 4; American Vacuum Society.

Choi, S. et al.; "Gas permeability of various graphite/epoxy composite laminates for cryogenic storage systems"; *Composites Part B: Engineering*; Bearing a date of 2008; pp. 782-791; vol. 39; Elsevier Science Ltd.

Chun, I. et al.; "Effect of the Cr-rich oxide surface on fast pumpdown to ultrahigh vacuum"; *Journal of Vacuum Science Technology A Vacuum, Surfaces, and Films*; Bearing a date of Sep./Oct. 1997; pp. 2518-2520; vol. 15; No. 5; American Vacuum Society.

Chun, I. et al.; "Outgassing rate characteristic of a stainless-steel extreme high vacuum system"; *Journal of Vacuum Science Technology*; Bearing a date of Jul./Aug. 1996; pp. 2636-2640; vol. 14; No. 4; American Vacuum Society.

Crawley, D J. et al.; "Degassing Characteristics of Some 'O' Ring Materials"; *Vacuum*; Bearing a date of 1963; pp. 7-9; vol. 14; Pergamon Press Ltd.

Csernatony, L.; "The Properties of Viton 'A' Elastomers II. The influence of permeation, diffusion and solubility of gases on the gas emission rate from an O-ring used as an atmospheric seal or high vacuum immersed"; *Vacuum*; Bearing a date of 1965; pp. 129-134; vol. 16; No. 3; Pergamon Press Ltd.

Day, C.; "The use of active carbons as cryosorbent"; *Colloids and Surfaces A Physicochemical and Engineering Aspects*; Bearing a date of 2001; pp. 187-206; vol. 187-188; Elsevier Science.

Della Porta, P.; "Gas problem and gettering in sealed-off vacuum devices"; *Vacuum*; Bearing a date of 1996; pp. 771-777; vol. 47; No. 6-8 Elsevier Science Ltd.

Dylla, H. F. et al.; "Correlation of outgassing of stainless steel and aluminum with various surface treatments"; *Journal of Vacuum Science Technology*; Bearing a date of Sep./Oct. 1993; pp. 2623-2636; vol. 11; No. 5; American Vacuum Society.

Elsey, R. J. "Outgassing of vacuum material I"; *Vacuum*; Bearing a date of 1975; pp. 299-306; vol. 25; No. 7; Pergamon Press Ltd.

Elsey, R. J. "Outgassing of vacuum materials II" *Vacuum*; Bearing a date of 1975; pp. 347-361; vol. 25; No. 8; Pergamon Press Ltd.

Engelmann, G. et al.; "Vacuum chambers in composite material"; *Journal of Vacuum Science Technology*; Bearing a date of Jul./Aug. 1987; pp. 2337-2341; vol. 5; No. 4; American Vacuum Society.

Eyssa, Y. M. et al.; "Thermodynamic optimization of thermal radiation shields for a cryogenic apparatus"; *Cryogenics*; Bearing a date of May 1978; pp. 305-307; vol. 18; IPC Business Press.

Glassford, A. P. M. et al.; "Outgassing rate of multilayer insulation"; 1978; Bearing a date of 1978; pp. 83-106.

Gupta, A. K. et al.; "Outgassing from epoxy resins and methods for its reduction"; *Vacuum*; Bearing a date of 1977; pp. 61-63; vol. 27; No. 12; Pergamon Press Ltd.

HaŁaczek, T. et al.; "Flat-plate cryostat for measurements of multilayer insulation thermal conductivity"; *Cryogenics*; Bearing a date of Oct. 1985; pp. 593-595; vol. 25; Butterworth & Co. Ltd.

HaŁaczek, T. et al.; "Unguarded cryostat for thermal conductivity measurements of multilayer insulations"; *Cryogenics*; Bearing a date of Sep. 1985; pp. 529-530; vol. 25; Butterworth & Co. Ltd.

HaŁaczek, T. L. et al.; "Heat transport in self-pumping multilayer insulation"; *Cryogenics*; Bearing a date of Jun. 1986; pp. 373-376; vol. 26; Butterworth & Co. Ltd.

HaŁaczek, T. L. et al.; "Temperature variation of thermal conductivity of self-pumping multilayer insulation"; *Cryogenics*; Bearing a date of Oct. 1986; pp. 544-546.; vol. 26; Butterworth & Co. Ltd.

Halldórsson, Árni, et al.; "The sustainable agenda and energy efficiency: Logistics solutions and supply chains in times of climate change"; *International Journal of Physical Distribution & Logistics Management*; Bearing a date of 2010; pp. 5-13; vol. 40; No. ½; Emerald Group Publishing Ltd.

Halliday, B. S.; "An introduction to materials for use in vacuum"; *Vacuum*; Bearing a date of 1987; pp. 583-585; vol. 37; No. 8-9; Pergamon Journals Ltd.

Hirohata, Y.; "Hydrogen desorption behavior of aluminium materials used for extremely high vacuum chamber"; *Journal of Vacuum Science Technology*; Bearing a date of Sep./Oct. 1993; pp. 2637-2641; vol. 11; No. 5; American Vacuum Society.

Holtrop, K. L. et al.; "High temperature outgassing tests on materials used in the DIII-D tokamak"; *Journal of Vacuum Science Technology*; Bearing a date of Jul./Aug. 2006; pp. 1572-; vol. 24; No. 4; American Vacuum Society.

Hong, S. et al.; "Investigation of gas species in a stainless steel ultrahigh vacuum chamber with hot cathode ionization gauges"; *Measurement Science and Technology*; Bearing a date of 2004; pp. 359-364; vol. 15; IOP Science.

Ishikawa, Y. et al.; "Reduction of outgassing from stainless surfaces by surface oxidation"; *Vacuum*; Bearing a date of 1990; pp. 1995-1997; vol. 4; No. 7-9; Pergamon Press PLC.

Ishikawa, Y.; "An overview of methods to suppress hydrogen outgassing rate from austenitic stainless steel with reference to UHV and EXV"; *Vacuum*; Bearing a date of 2003; pp. 501-512; vol. 69; No. 4; Elsevier Science Ltd.

Ishimaru, H. et al.; "All Aluminum Alloy Vacuum System for the TRISTANe+e−Storage"; *IEEE Transactions on Nuclear Science*; Bearing a date of Jun. 1981; pp. 3320-3322; vol. NS-28; No. 3.

Ishimaru, H. et al.; "Fast pump-down aluminum ultrahigh vacuum system"; *Journal of Vacuum Science Technology*; Bearing a date of May/Jun. 1992; pp. 547-552 ; vol. 10; No. 3; American Vacuum Society.

Ishimaru, H. et al.; "Turbomolecular pump with an ultimate pressure of $10^{-12}$ Torr"; *Journal of Vacuum Science Technology*; Bearing a date of Jul./Aug. 1994; pp. 1695-1698; vol. 12; No. 4; American Vacuum Society.

Ishimaru, H.; "All-aluminum-alloy ultrahigh vacuum system for a large-scale electron-positron collider"; *Journal of Vacuum Science Technology*; Bearing a date of Jun. 1984; pp. 1170-1175; vol. 2; No. 2; American Vacuum Society.

Ishimaru, H.; "Aluminium alloy-sapphire sealed window for ultrahigh vacuum"; *Vacuum*; Bearing a date of 1983; pp. 339-340.; vol. 33; No. 6; Pergamon Press Ltd.

Ishimaru, H.; "Bakeable aluminium vacuum chamber and bellows with an aluminium flange and metal seal for ultra-high vacuum"; *Journal of Vacuum Science Technology*; Bearing a date of Nov./Dec. 1978; pp. 1853-1854; vol. 15; No. 6; American Vacuum Society.

Ishimaru, H.; "Ultimate pressure of the order of $10^{-13}$ Torr in an aluminum alloy vacuum chamber"; *Journal of Vacuum Science and Technology*; Bearing a date of May/Jun. 1989; pp. 2439-2442; vol. 7; No. 3; American Vacuum Society.

Jacob, S. et al.; "Investigations into the thermal performance of multilayer insulation (300-77 K) Part 2: Thermal analysis"; *Cryogenics*; Bearing a date of 1992; pp. 1147-1153; vol. 32; No. 12; Butterworth-Heinemann Ltd.

Jacob, S. et al.; "Investigations into the thermal performance of multilayer insulation (300-77 K) Part 1: Calorimetric studies"; *Cryogenics*; Bearing a date of 1992; pp. 1137-1146; vol. 32; No. 12; Butterworth-Heinemann Ltd.

Jenkins, C. H. M.; "Gossamer spacecraft: membrane and inflatable structures technology for space applications"; AIAA; Bearing a date of 2000; pp. 503-527; vol. 191.

Jhung, K. H. C. et al.; "Achievement of extremely high vacuum using a cryopump and conflat aluminium"; *Vacuum*; Bearing a date of 1992; pp. 309-311; vol. 43; No. 4; Pergamon Press PLC.

Kato, S. et al.; "Achievement of extreme high vacuum in the order of $10^{-10}$ Pa without baking of test chamber"; *Journal of Vacuum Science Technology*; Bearing a date of May/Jun. 1990; pp. 2860-2864; vol. 8 ; No. 3; American Vacuum Society.

(56) References Cited

OTHER PUBLICATIONS

Keller, K. et al.; "Application of high temperature multilayer insulations"; *Acta Astronautica*; Bearing a date of 1992; pp. 451-458; vol. 26; No. 6; Pergamon Press Ltd.
Koyatsu, Y. et al. "Measurements of outgassing rate from copper and copper alloy chambers"; *Vacuum*; Bearing a date of 1996; pp. 709-711; vol. 4; No. 6-8; Elsevier Science Ltd.
Kristensen, D. et al.; "Stabilization of vaccines: Lessons learned"; *Human Vaccines*; Bearing a date of Mar. 2010; pp. 227-231; vol. 6; No. 3; Landes Bioscience.
Kropschot, R. H.; "Multiple layer insulation for cryogenic applications"; *Cryogenics*; Bearing a date of Mar. 1961; pp. 135-135; vol. 1.
Li, Y.; "Design and pumping characteristics of a compact titanium—vanadium non-evaporable getter pump"; *Journal of Vacuum Science Technology*; Bearing a date of May/Jun. 1998; pp. 1139-1144; vol. 16; No. 3; American Vacuum Society.
Liu, Y. C. et al.; "Thermal outgassing study on aluminum surfaces"; *Vacuum*; Bearing a date of 1993; pp. 435-437; vol. 44; No. 5-7; Pergamon Press Ltd.
Londer, H. et al.; "New high capacity getter for vacuum insulated mobile $LH_2$ storage tank systems"; *Vacuum*; Bearing a date of 2008; pp. 431-434; vol. 82; No. 4; Elsevier Ltd.
Matsuda, A. et al.; "Simple structure insulating material properties for multilayer insulation"; *Cryogenics*; Bearing a date of Mar. 1980; pp. 135-138; vol. 20; IPC Business Press.
Mikhalchenko, R. S. et al.; "Study of heat transfer in multilayer insulations based on composite spacer materials."; *Cryogenics*; Bearing a date of Jun. 1983; pp. 309-311; vol. 23; Butterworth & Co. Ltd.
Mikhalchenko, R. S. et al.; "Theoretical and experimental investigation of radiative-conductive heat transfer in multilayer insulation"; *Cryogenics*; Bearing a date of May 1985; pp. 275-278; vol. 25; Butterworth & Co. Ltd.
Miki, M. et al.; "Characteristics of extremely fast pump-down process in an aluminum ultrahigh vacuum system"; *Journal of Vacuum Science Technology*; Bearing a date of Jul./Aug. 1994; pp. 1760-1766; vol. 12; No. 4; American Vacuum Society.
Mohri, M. et al.; "Surface study of Type 6063 aluminium alloys for vacuum chamber materials"; *Vacuum*; Bearing a date of 1984; pp. 643-647; vol. 34; No. 6; Pergamon Press Ltd.
Mukugi, K. et al.; "Characteristics of cold cathode gauges for outgassing measurements in uhv range"; *Vacuum*; Bearing a date of 1993; pp. 591-593; vol. 44; No. 5-7; Pergamon Press Ltd.
Nemanič, V. et al.; "Anomalies in kinetics of hydrogen evolution from austenitic stainless steel from 300 to 1000° C"; *Journal of Vacuum Science Technology*; Bearing a date of Jan./Feb. 2001; pp. 215-222; vol. 19; No. 1; American Vacuum Society.
Nemanič, V. et al.; "Outgassing in thin wall stainless steel cells"; *Journal of Vacuum Science Technology*; Bearing a date of May/Jun. 1999; pp. 1040-1046; vol. 17; No. 3; American Vacuum Society.
Nemanič, V.; "Outgassing of thin wall stainless steel chamber"; *Vacuum*; Bearing a date of 1998; pp. 431-437; vol. 50; No. 3-4; Elsevier Science Ltd.
Nemanič, V.; "Vacuum insulating panel"; *Vacuum*; bearing a date of 1995; pp. 839-842; vol. 46; No. 8-10; Elsevier Science Ltd.
Odaka, K. et al.;"Effect of baking temperature and air exposure on the outgassing rate of type 316L stainless steel"; *Journal of Vacuum Science Technology*; Bearing a date of Sep./Oct. 1987; pp. 2902-2906; vol. 5; No. 5; American Vacuum Society.
Odaka, K.; "Dependence of outgassing rate on surface oxide layer thickness in type 304 stainless steel before and after surface oxidation in air"; *Vacuum*; Bearing a date of 1996; pp. 689-692; vol. 47; No. 6-8; Elsevier Science Ltd.
Okamura, S. et al.; "Outgassing measurement of finely polished stainless steel"; *Journal of Vacuum Science Technology*; Bearing a date of Jul./Aug. 1991; pp. 2405-2407; vol. 9; No. 4; American Vacuum Society.
Patrick, T. J.; "Outgassing and the choice of materials for space instrumentation"; *Vacuum*; Bearing a date of 1973; pp. 411-413; vol. 23; No. 11; Pergamon Press Ltd.

Patrick, T. J.; "Space environment and vacuum properties of spacecraft materials"; *Vacuum*; Bearing a date of 1981; pp. 351-357; vol. 31; No. 8-9; Pergamon Press Ltd.
Poole, K. F. et al.; "Hialvac and Teflon outgassing under ultra-high vacuum conditions"; *Vacuum*; Bearing a date of Jun. 30, 1980; pp. 415-417; vol. 30; No. 10; Pergamon Press Ltd.
Redhead, P. A.; "Recommended practices for measuring and reporting outgassing data"; *Journal of Vacuum Science Technology*; Bearing a date of Sep./Oct. 2002; pp. 1667-1675; vol. 20; No. 5; American Vacuum Society.
Rutherford, S; "The Benefits of Viton Outgassing"; Bearing a date of 1997; pp. 1-5; Duniway Stockroom Corp.
Saito, K. et al.; "Measurement system for low outgassing materials by switching between two pumping paths"; *Vacuum*; Bearing a date of 1996; pp. 749-752; vol. 47; No. 6-8; Elsevier Science Ltd.
Saitoh, M. et al.; "Influence of vacuum gauges on outgassing rate measurements"; *Journal of Vacuum Science Technology*; Bearing a date of Sep./Oct. 1993; pp. 2816-2821; vol. 11; No. 5; American Vacuum Society.
Santhanam, S. M. T. J. et al. ;"Outgassing rate of reinforced epoxy and its control by different pretreatment methods"; *Vacuum*; Bearing a date of 1978; pp. 365-366; vol. 28; No. 8-9; Pergamon Press Ltd.
Sasaki, Y. T.; "Reducing SS 304/316 hydrogen outgassing to $2\times10^{-15}$ torr 1/cm $^2$s"; *Journal of Vacuum Science Technology*; Bearing a date of Jul./Aug. 2007; pp. 1309-1311; vol. 25; No. 4; American Vacuum Society.
Scurlock, R. G. et al.; "Development of multilayer insulations with thermal conductivities below $0.1\ \mu W\ cm^{-1}K^{-1}$,"; *Cryogenics*; Bearing a date of May 1976; pp. 303-311; vol. 16.
Setia, S. et al.; "Frequency and causes of vaccine wastage"; *Vaccine*; Bearing a date of 2002; pp. 1148-1156; vol. 20; Elsevier Science Ltd.
Shu, Q. S. et al.; "Heat flux from 277 to 77 K through a few layers of multilayer insulation"; *Cryogenics*; Bearing a date of Dec. 1986; pp. 671-677; vol. 26; Butterworth & Co. Ltd.
Shu, Q. S. et al.; "Systematic study to reduce the effects of cracks in multilayer insulation Part 1: Theoretical model"; *Cryogenics*; Bearing a date of May 1987; pp. 249-256; vol. 27; Butterworth & Co. Ltd.
Shu, Q. S. et al.; "Systematic study to reduce the effects of cracks in multilayer insulation Part 2: experimental results"; *Cryogenics*; Bearing a date of Jun. 1987; pp. 298-311; vol. 27; No. 6; Butterworth & Co. Ltd.
Suemitsu, M. et al.; "Development of extremely high vacuums with mirror-polished Al-alloy chambers"; *Vacuum*; Bearing a date of 1993; pp. 425-428; vol. 44; No. 5-7; Pergamon Press Ltd.
Suemitsu, M. et al.; "Ultrahigh-vacuum compatible mirror-polished aluminum-alloy surface: Observation of surface-roughness-correlated outgassing rates"; *Journal of Vacuum Science Technology*; Bearing a date of May/Jun. 1992; pp. 570-572; vol. 10; No. 3; American Vacuum Society.
Tatenuma, K. et al.; "Acquisition of clean ultrahigh vacuum using chemical treatment"; *Journal of Vacuum Science Technology*; Bearing a date of Jul./Aug. 1998; pp. 2693-2697; vol. 16; No. 4; American Vacuum Society.
Tatenuma, K.; "Quick acquisition of clean ultrahigh vacuum by chemical process technology"; *Journal of Vacuum Science Technology*; Bearing a date of Jul./Aug. 1993; pp. 2693-2697; vol. 11; No. 4; American Vacuum Society.
Tripathi, A. et al.; "Hydrogen intake capacity of ZrVFe alloy bulk getters"; *Vacuum*; Bearing a date of Aug. 6, 1997; pp. 1023-1025; vol. 48; No. 12; Elsevier Science Ltd.
Watanabe, S. et al.; "Reduction of outgassing rate from residual gas analyzers for extreme high vacuum measurements"; *Journal of Vacuum Science Technology*; Bearing a date of Nov./Dec. 1996; pp. 3261-3266; vol. 14; No. 6; American Vacuum Society.
Wiedemann, C. et al.; "Multi-layer Insulation Literatures Review"; *Advances*; Printed on May 2, 2011; pp. 1-10; German Aerospace Center.
Yamazaki, K. et al.; "High-speed pumping to UHV"; *Vacuum*; Bearing a date of 2010; pp. 756-759; vol. 84; Elsevier Science Ltd.
Zalba, B. et al.; "Review on thermal energy storage with phase change: materials, heat transfer analysis and applications"; *Applied Thermal Engineering*; Bearing a date of 2003; pp. 251-283; vol. 23; Elsevier Science Ltd.

(56) References Cited

OTHER PUBLICATIONS

Zhitomirskij, I.S. et al.; "A theoretical model of the heat transfer processes in multilayer insulation"; Cryogenics; Bearing a date of May 1979; pp. 265-268; IPC Business Press.

Bowers et al.; U.S. Appl. No. 12/152,467; filed May 13, 2008.

Bowers et al.; U.S. Appl. No. 12/152,465, filed May 13, 2008.

Hyde et al.; U.S. Appl. No. 12/001,757, filed Dec. 11, 2007.

Hyde et al.; U.S. Appl. No. 12/008,695, filed Jan. 10, 2008.

Hyde et al.; U.S. Appl. No. 12/006,089, filed Dec. 27, 2007.

Hyde et al.; U.S. Appl. No. 12/006,088, filed Dec. 27, 2007.

Hyde et al.; U.S. Appl. No. 12/012,490, filed Jan. 31, 2008.

Hyde et al.; U.S. Appl. No. 12/077,322, filed Mar. 17, 2008.

U.S. Appl. No. 13/135,126, Deane et al.

Cabeza, L. F. et al.; "Heat transfer enhancement in water when used as PCM in thermal energy storage"; Applied Thermal Engineering; 2002; pp. 1141-1151; vol. 22; Elsevier Science Ltd.

Chen, Dexiang et al.; "Characterization of the freeze sensitivity of a hepatitis B vaccine"; Human Vaccines; Jan. 2009; pp. 26-32; vol. 5, Issue 1; Landes Bioscience.

Edstam, James S. et al.; "Exposure of hepatitis B vaccine to freezing temperatures during transport to rural health centers in Mongolia"; Preventive Medicine; 2004; pp. 384-388; vol. 39; The Institute for Cancer Prevention and Elsevier Inc.

Efe, Emine et al.; "What do midwives in one region in Turkey know about cold chain?"; Midwifery; 2008; pp. 328-334; vol. 24; Elsevier Ltd.

Günter, M. M. et al.; "Microstructure and bulk reactivity of the nonevaporable getter $Zr_{57}V_{36}Fe_7$"; J. Vac. Sci. Technol. A; Nov./Dec. 1998; pp. 3526-3535; vol. 16, No. 6; American Vacuum Society.

Hipgrave, David B. et al ; "Immunogenicity of a Locally Produced Hepatitis B Vaccine With the Birth Dose Stored Outside the Cold Chain in Rural Vietnam"; Am. J. Trop. Med. Hyg.; 2006; pp. 255-260; vol. 74, No. 2; The American Society of Tropical Medicine and Hygiene.

Hipgrave, David B. et al.; "Improving birth dose coverage of hepatitis B vaccine"; Bulletin of the World Health Organization; Jan. 2006; pp. 65-71; vol. 84, No. 1; World Health Organization.

Hobson, J. P. et al.; "Pumping of methane by St707 at low temperatures"; J. Vac. Sci. Technol. A; May/Jun. 1986; pp. 300-302; vol. 4, No. 3; American Vacuum Society.

Kendal, Alan P. et al.; "Validation of cold chain procedures suitable for distribution of vaccines by public health programs in the USA"; Vaccine; 1997; pp. 1459-1465; vol. 15, No. 12/13; Elsevier Science Ltd.

Khemis, O. et al.; "Experimental analysis of heat transfers in a cryogenic tank without lateral insulation"; Applied Thermal Engineering; 2003; pp. 2107-2117; vol. 23; Elsevier Ltd.

Li, Yang et al.; "Study on effect of liquid level on the heat leak into vertical cryogenic vessels"; Cryogenics; 2010; pp. 367-372; vol. 50; Elsevier Ltd.

Magennis, Teri et al. "Pharmaceutical Cold Chain: A Gap in the Last Mile—Part 1. Wholesaler/Distributer: Missing Audit Assurance"; Pharmaceutical & Medical Packaging News; Sep. 2010; pp. 44, 46-48, and 50; pmpnews.com.

Matolin, V. et al.; "Static SIMS study of TiZrV NEG activation"; Vacuum; 2002; pp. 177-184; vol. 67; Elsevier Science Ltd.

Nelson, Carib M. et al.; "Hepatitis B vaccine freezing in the Indonesian cold chain: evidence and solutions"; Bulletin of the World Health Organization; Feb. 2004; pp. 99-105 (plus copyright page); vol. 82, No. 2; World Health Organization.

Ren, Qian et al.; "Evaluation of an Outside-The-Cold-Chain Vaccine Delivery Strategy in Remote Regions of Western China"; Public Health Reports; Sep.-Oct. 2009; pp. 745-750; vol. 124.

Rogers, Bonnie et al.; "Vaccine Cold Chain—Part 1. Proper Handling and Storage of Vaccine"; AAOHN Journal; 2010; pp. 337-344 (plus copyright page); vol. 58, No. 8; American Association of Occupational Health Nurses, Inc.

Rogers, Bonnie et al.; Vaccine Cold Chain—Part 2. Training Personnel and Program Management; AAOHN Journal; 2010; pp. 391-402 (plus copyright page); vol. 58, No. 9; American Association of Occupational Health Nurses, Inc.

Techathawat, Sirirat et al.; "Exposure to heat and freezing in the vaccine cold chain in Thailand"; Vaccine; 2007; p. 1328-1333; vol. 25; Elsevier Ltd.

Thakker, Yogini et al.; "Storage of Vaccines in the Community: Weak Link in the Cold Chain?"; British Medical Journal; Mar. 21, 1992; pp. 756-758; vol. 304, No. 6829; BMJ Publishing Group.

Wang, Lixia et al.; "Hepatitis B vaccination of newborn infants in rural China: evaluation of a village-based, out-of-cold-chain delivery strategy"; Bulletin of the World Health Organization; Sep. 2007; pp. 688-694; vol. 85, No. 9; World Health Organization.

Wei, Wei et al.; "Effects of structure and shape on thermal performance of Perforated Multi-Layer Insulation Blankets"; Applied Thermal Engineering; 2009; pp. 1264-1266; vol. 29; Elsevier Ltd.

World Health Organization; "Guidelines on the international packaging and shipping of vaccines"; Department of Immunization, Vaccines and Biologicals; Dec. 2005; 40 pages; WHO/IVB/05.23.

PCT International Search Report; International App. No. PCT/US 11/00234; Jun. 9, 2011; pp. 1-4.

U.S. Appl. No. 12/927,982, Deane et al.

U.S. Appl. No. 12/927,981, Chou et al.

Chen, Dexiang, et al.; "Opportunities and challenges of developing thermostable vaccines"; Expert Reviews Vaccines; 2009; pp. 547-557; vol. 8, No. 5; Expert Reviews Ltd.

Greenbox Systems; "Thermal Management System"; 2010; Printed on: Feb. 3, 2011; p. 1 of 1; located at http://www.greenboxsystems.com.

Matthias, Dipika M., et al.; "Freezing temperatures in the vaccine cold chain: A systematic literature review"; Vaccine; 2007; pp. 3980-3986; vol. 25; Elsevier Ltd.

Pure Temp; "Technology"; Printed on: Feb. 9, 2011; p. 1-3; located at http://puretemp.com/technology.html.

Spur Industries Inc.; "The Only Way to Get Them Apart is to Melt Them Apart"; 2006; printed on Feb. 8, 2011; pp. 1-3; located at http://www.spurind.com/applications.php.

Williams, Preston; "Greenbox Thermal Management System Refrigerate-able 2 to 8 C Shipping Containers"; Printed on: Feb. 9, 2011; p. 1; located at http://www.puretemp.com/documents/Refrigcrate-able%202%20to%208%20C%20Shipping%20Containers.pdf.

Wirkas, Theo, et al.; "A vaccine cold chain freezing study in PNG highlights technology needs for hot climate countries"; Vaccine; 2007; pp. 691-697; vol. 25; Elsevier Ltd.

World Health Organization; "Preventing Freeze Damage to Vaccines: Aide-memoire for prevention of freeze damage to vaccines"; 2007; printed on Feb. 8, 2011; pp. 1-4; WHO/IVB/07.09; World Health Organization.

World Health Organization; "Temperature sensitivity of vaccines"; Department of Immunization, Vaccines and Biologicals, World Health Organization; Aug. 2006; pp. 1-62 plus cover sheet, pp. i-ix, and end sheet (73 pages total); WHO/IVB/06.10; World Health Organization.

U.S. Appl. No. 12/658,579, Deane et al.

Adams, R. O.; "A review of the stainless steel surface"; The Journal of Vacuum Science and Technology A; Bearing a date of Jan.-Mar. 1983; pp. 12-18; vol. 1, No. 1; American Vacuum Society.

Bartl, J., et al.; "Emissivity of aluminium and its importance for radiometric measurement"; Measurement Science Review; Bearing a date of 2004; pp. 31-36; vol. 4, Section 3.

Beavis, L. C.; "Interaction of Hydrogen with the Surface of Type 304 Stainless Steel"; The Journal of Vacuum Science and Technology; Bearing a date of Mar.-Apr. 1973; pp. 386-390; vol. 10, No. 2; American Vacuum Society.

Benvenuti, C., et al.; "Pumping characteristics of the St707 nonevaporable getter (Zr 70 V 24.6-Fe 5.4 wt %)"; The Journal of Vacuum Science and Technology A; Bearing a date of Nov.-Dec. 1996; pp. 3278-3282; vol. 14, No. 6; American Vacuum Society.

Demko, J. A., et al.; "Design Tool for Cryogenic Thermal Insulation Systems"; Advances in Cryogenic Engineering: Transactions of the Cryogenic Engineering Conference-CEC; Bearing a date of 2008; pp. 145-151; vol. 53; American Institute of Physics.

(56) References Cited

OTHER PUBLICATIONS

Hedayat, A., et al.; "Variable Density Multilayer Insulation for Cryogenic Storage"; Contract NAS8-40836; $36^{th}$ Joint Propulsion Conference; Bearing a date of Jul. 17-19, 2000; pp. 1-10.
Horgan, A. M., et al.; "Hydrogen and Nitrogen Desorption Phenomena Associated with a Stainless Steel 304 Low Energy Electron Diffraction (LEED) and Molecular Beam Assembly"; The Journal of Vacuum Science and Technology; Bearing a date of Jul.-Aug. 1972; pp. 1218-1226; vol. 9, No. 4.
Keller, C. W., et al.; "Thermal Performance of Multilayer Insulations, Final Report, Contract NAS 3-14377"; Bearing a date of Apr. 5, 1974; pp. 1-446.
Kishiyama, K., et al.; "Measurement of Ultra Low Outgassing Rates for NLC UHV Vacuum Chambers"; Proceedings of the 2001 Particle Accelerator Conference, Chicago; Bearing a date of 2001; pp. 2195-2197; IEEE.
Little, Arthur D.; "Liquid Propellant Losses During Space Flight, Final Report on Contract No. NASw-615"; Bearing a date of Oct. 1964; pp. 1-315.
Lockheed Missiles & Space Company; "High-Performance Thermal Protection Systems, Contract NAS 8-20758, vol. II"; Bearing a date of Dec. 31, 1969; pp. 1-117.
Nemanič, Vincenc, et al.; "Experiments with a thin-walled stainless-steel vacuum chamber"; The Journal of Vacuum Science and Technology A; Bearing a date of Jul.-Aug. 2000; pp. 1789-1793; vol. 18, No. 4; American Vacuum Society.
Nemanič, Vincenc, et al.; "Outgassing of a thin wall vacuum insulating panel"; Vacuum; Bearing a date of 1998; pp. 233-237; vol. 49, No. 3; Elsevier Science Ltd.
Nemanič, Vincenc, et al.; "A study of thermal treatment procedures to reduce hydrogen outgassing rate in thin wall stainless steel cells"; Vacuum; Bearing a date of 1999; pp. 277-280; vol. 53; Elsevier Science Ltd.
PCT International Search Report; International App. No. PCT/US 09/01715; Jan. 8, 2010; pp. 1-2.
Sasaki, Y. Tito; "A survey of vacuum material cleaning procedures: A subcommittee report of the American Vacuum Society Recommended Practices Committee"; The Journal of Vacuum Science and Technology A; Bearing a date of May-Jun. 1991; pp. 2025-2035; vol. 9, No. 3; American Vacuum Society.
U.S. Department of Health and Human Services, Centers for Disease Control and Prevention; "Recommended Immunization Schedule for Persons Aged 0 Through 6 Years—United States"; Bearing a date of 2009; p. 1.
Vesel, Alenka, et al.; "Oxidation of AISI 304L stainless steel surface with atomic oxygen"; Applied Surface Science; Bearing a date of 2002; pp. 94-103; vol. 200; Elsevier Science B.V.
Young, J. R.; "Outgassing Characteristics of Stainless Steel and Aluminum with Different Surface Treatments"; The Journal of Vacuum Science and Technology; Bearing a date of Oct. 14, 1968; pp. 398-400; vol. 6, No. 3.
Zajec, Bojan, et al.; "Hydrogen bulk states in stainless-steel related to hydrogen release kinetics and associated redistribution phenomena"; Vacuum; Bearing a date of 2001; pp. 447-452; vol. 61; Elsevier Science Ltd.
U.S. Appl. No. 13/385,088, Hyde et al.
U.S. Appl. No. 13/374,218, Hyde et al.
U.S. Appl. No. 13/200,555, Chou et al.
U.S. Appl. No. 13/199,439, Hyde et al.
Saes Getters; "St707 Getter Alloy for Vacuum Systems"; printed on Sep. 22, 2011; pp. 1-2; located at http://www.saegetters.com/default.aspx?idPage=212.
PCT International Search Report; International App. No. PCT/US08/13646; Apr. 9, 2009; pp. 1-2.
PCT International Search Report; International App. No. PCT/US08/13648; Mar. 13, 2009; pp. 1-2.
PCT International Search Report; International App. No. PCT/US08/13642; Feb. 26, 2009; pp. 1-2.
PCT International Search Report; International App. No. PCT/US08/13643; Feb. 20, 2009; pp. 1-2.
U.S. Appl. No. 13/489,058 Bowers et al.
PCT International Search Report; Application No. PCT/US2011/001939; Mar. 27, 2012; pp. 1-2.
Chinese Office Action; Application No. 200880120367.X; Oct. 25, 2012 (received by our agent on Oct. 29, 2012); pp. 1-5; No English Translation Provided.
Chinese State Intellectual Property Office; Chinese Office Action; App. No. 200880119777.2; Jan. 7, 2013 (received by our agent on Jan. 9, 2013); pp. 1-12; No English Translation Provided.
Intellectual Property Office of the People's Republic of China; Office Action; Chinese Application No. 200880119918.0; Dec. 12, 2012; pp. 1-11.
Chinese State Intellectual Property Office; Office Action; Chinese Application No. 200980109399.4; dated Aug. 29, 2012; pp. 1-12 (No translation provided).
Winn, Joshua N. et al.; "Omnidirectional reflection from a one-dimensional photonic crystal"; Optics Letters; Oct. 15, 1998; pp. 1573-1575; vol. 23, No. 20; Optical Society of America.
U.S. Appl. No. 13/720,328, Hyde et al.
U.S. Appl. No. 13/720,256, Hyde et al.
U.S. Appl. No. 13/853,245, Eckhoff et al.
Bine Informationsdienst; "Zeolite/water refrigerators, Projekt*info* 16/10"; BINE Information Service; printed on Feb. 12, 2013; pp. 1-4; FIZ Karlsruhe, Germany; located at: http://www.bine.info/fileadmin/content/Publikationen/Englische_Infos/projekt_1610_engl_internetx.pdf.
Conde-Petit, Manuel R.; "Aqueous solutions of lithium and calcium chlorides:—Property formulations for use in air conditioning equipment design"; 2009; pp. 1-27 plus two cover pages; M. Conde Engineering, Zurich, Switzerland.
Cool-System Keg GmbH; "Cool-System presents: CoolKeg® The world'first self-chilling Keg!"; printed on Feb. 6, 2013; pp. 1-5; located at: http://www.coolsystem.de/.
Dawoud, et al.; "Experimental study on the kinetics of water vapor sorption on selective water sorbents, silica gel and alumina under typical operating conditions of sorption heat pumps"; International Journal of Heat and Mass Transfer; 2003; pp. 273-281; vol. 46; Elsevier Science Ltd.
Dometic S.A.R.L.; "Introduction of Zeolite Technology into refrigeration systems, LIFE04 ENV/LU/000829, Layman's Report"; printed on Feb. 6, 2013; pp. 1-10; located at: http://ec.europa.eu/environment/life/project/Projects/index.cfm?fuseaction=home.showFile&rep=file&fil=LIFE04_ENV_LU_000829_LAYMAN.pdf.
Dow Chemical Company; "Calcium Chloride Handbook: A Guide to Properties, Forms, Storage and Handling"; Aug. 2003; pp. 1-28.
Gast Manufacturing, Inc.; "Vacuum and Pressure Systems Handbook"; printed on Jan. 3, 2013; pp. 1-20; located at:http://www.gastmfg.com/vphb/vphb_sl.pdf.
Gea Wiegand; "Pressure loss in vacuum lines with water vapour"; printed on Mar. 13, 2013; pp. 1-2; located at: http://produkte.gea-wiegand.de/GEA/GEACategory/139/index_en.html.
Hall, Larry D.; "Building Your Own Larry Hall Icyball"; printed on Mar. 27, 2013; pp. 1-4; located at: http://crosleyautoclub.com/IcyBall/HomeBuilt/HallPlans/IB_Directions.html.
Kozubal, et al.; "Desiccant Enhanced Evaporative Air-Conditioning (DEVap): Evaluation of a New Concept in Ultra Efficient Air Conditioning, Technical Report NREL/TP-5500-49722"; National Renewable Energy Laboratory; Jan. 2011; pp. i-vii, 1-60, plus three cover pages and Report Documentation Page.
Machine-History.Com; "Refrigeration Machines"; printed on Mar. 27, 2013; pp. 1-10; located at: http://www.machine-history.com/Refrigeration%20Machines.
Marquardt, Niels; "Introduction to the Principles of Vacuum Physics"; 1999; pp. 1-24; located at: http:www.cientificosaficionados.com/libros/CERN/vaciol-CERN.pdf.
Modern Mechanix; "Icyball Is Practical Refrigerator for Farm or Camp Use (Aug, 1930)"; bearing a date of Aug. 1930; printed on Mar. 27, 2013; pp. 1-3; located at: http://blog.modernmechanix.com/icyball-is-practical-refrigerator-for-farm-or-camp-use/.
NSM Archive; "Band structure and carrier concentration"; date of Jan. 22, 2004 provided by examiner, printed on Feb. 16, 2013; pp.

(56) References Cited

OTHER PUBLICATIONS 1-10, 1 additional page of archive information; located at: http://web.archive.org/20040122200811/http://www.ioffe.rssi.ru/SVA/NSM/Semicond/SiC/bandstr.html.
Oxychem; "Calcium Chloride, A Guide to Physical Properties"; printed on Jan. 3, 2013; pp. 1-9, plus two cover pages and back page; Occidental Chemical Corporation; located at: http://www.cal-chlor.com/PDF/GUIDE-physical-properties.pdf.
Restuccia, et al.; "Selective water sorbent for solid sorption chiller: experimental results and modeling"; International Journal of Refrigeration; 2004; pp. 284-293; vol. 27; Elsevier Ltd and IIR.
Rezk, et al.; "Physical and operating conditions effects on silica gel/water adsorption chiller performance"; Applied Energy; 2012; pp. 142-149; vol. 89; Elsevier Ltd.
Rietschle Thomas; "Calculating Pipe Size & Pressure Drops in Vacuum Systems, Section 9—Technical Reference"; printed on Jan. 3, 2013; pp. 9-5 through 9-7; located at: http://www.ejglobaline.com/Tech.htm.
Saha, et al.; "A new generation of cooling device employing $CaCl_2$-in-silica gel-water system"; International Journal of Heat and Mass Transfer; 2009; pp. 516-524; vol. 52; Elsevier Ltd.
UOP; "An Introduction to Zeolite Molecular Sieves"; printed on Jan. 10, 2013; pp. 1-20; located at: http://www.eltrex.pl/pdf/karty/adsorbenty/ENG-Introduction%20to%20Zeolite%20Molecular%20Sieves.pdf.
Wang, et al.; "Study of a novel silica gel-water adsorption chiller. Part I. Design and performance prediction"; International Journal of Refrigeration; 2005; pp. 1073-1083; vol. 28; Elsevier Ltd and IIR.
Wikipedia; "Icyball"; Mar. 14, 2013; printed on Mar. 27, 2013; pp. 1-4; located at: http://en.wikipedia.org/wiki/Icyball.
U.S. Appl. No. 13/907,470, filed May 31, 2013, Bowers et al.
U.S. Appl. No. 13/906,909, filed May 31, 2013, Bloedow et al.
Abdul-Wahab et al.; "Design and experimental investigation of portable solar thermoelectric refrigerator"; Renewable Energy; 2009; pp. 30-34; vol. 34; Elsevier Ltd.
Astrain et al.; "Computational model for refrigerators based on Peltier effect application"; Applied Thermal Engineering; 2005; pp. 3149-3162; vol. 25; Elsevier Ltd.
Azzouz et al.; "Improving the energy efficiency of a vapor compression system using a phase change material"; Second Conference on Phase Change Material & Slurry: Scientific Conference & Business Forum; Jun. 15-17, 2005; pp. 1-11; Yverdon-les-Bains, Switzerland.
Chatterjee et al.; "Thermoelectric cold-chain chests for storing/transporting vaccines in remote regions"; Applied Energy; 2003; pp. 415-433; vol. 76; Elsevier Ltd.
Chiu et al.; "Submerged finned heat exchanger latent heat storage design and its experimental verification"; Applied Energy; 2012; pp. 507-516; vol. 93; Elsevier Ltd.
Conway et al.; "Improving Cold Chain Technologies through the Use of Phase Change Material"; Thesis, University of Maryland; 2012; pp. ii-xv and 16-228.
Dai et al.; "Experimental investigation and analysis on a thermoelectric refrigerator driven by solar cells"; Solar Energy Materials & Solar Cells; 2003; pp. 377-391; vol. 77; Elsevier Science B.V.
Ghoshal et al.; "Efficient Switched Thermoelectric Refrigerators for Cold Storage Applications"; Journal of Electronic Materials; 2009; pp. 1-6; doi: 10.1007/s11664-009-0725-3.
Groulx et al.; "Solid-Liquid Phase Change Simulation Applied to a Cylindrical Latent Heat Energy Storage System"; Excerpt from the Proceedings of the COMSOL Conference, Boston; 2009; pp. 1-7.
Jiajitsawat, Somchai; "A Portable Direct-PV Thermoelectric Vaccine Refrigerator with Ice Storage Through Heat Pipes"; Dissertation, University of Massachusetts, Lowell; 2008; three cover pages, pp. ii-x, 1-137.

Kempers et al.; "Characterization of evaporator and condenser thermal resistances of a screen mesh wicked heat pipe"; International Journal of Heat and Mass Transfer; 2008; pp. 6039-6046; vol. 51; Elsevier Ltd.
Mohamad et al.; "An Analysis of Sensitivity Distribution Using Two Differential Excitation Potentials in ECT"; IEEE Fifth International Conference on Sensing Technology; 2011; pp. 575-580; IEEE.
Mohamad et al.; "A introduction of two differential excitation potentials technique in electrical capacitance tomography"; Sensors and Actuators A; 2012; pp. 1-10; vol. 180; Elsevier B.V.
Mughal et al.; "Review of Capacitive Atmospheric Icing Sensors"; The Sixth International Conference on Sensor Technologies and Applications (SENSORCOMM); 2012; pp. 42-47; IARIA.
Omer et al.; "Design optimization of thermoelectric devices for solar power generation"; Solar Energy Materials and Solar Cells; 1998; pp. 67-82; vol. 53; Elsevier Science B.V.
Omer et al.; "Experimental investigation of a thermoelectric refrigeration system employing a phase change material integrated with thermal diode (thermosyphons)"; Applied Thermal Engineering; 2001; pp. 1265-1271; vol. 21; Elsevier Science Ltd.
Oró et al.; "Review on phase change materials (PCMs) for cold thermal energy storage applications"; Applied Energy; 2012; pp. 1-21; doi: 10.1016/j.apenergy.2012.03.058; Elsevier Ltd.
Owusu, Kwadwo Poku; "Capacitive Probe for Ice Detection and Accretion Rate Measurement: Proof of Concept"; Master of Science Thesis, Department of Mechanical Engineering, University of Manitoba; 2010; pp. i-xi, 1-95.
Peng et al.; "Determination of the optimal axial length of the electrode in an electrical capacitance tomography sensor"; Flow Measurement and Instrumentation; 2005; pp. 169-175; vol. 16; Elsevier Ltd.
Peng et al.; "Evaluation of Effect of Number of Electrodes in ECT Sensors on Image Quality"; IEEE Sensors Journal; May 2012; pp. 1554-1565; vol. 12, No. 5; IEEE.
Riffat et al.; "A novel thermoelectric refrigeration system employing heat pipes and a phase change material: an experimental investigation"; Renewable Energy; 2001; pp. 313-323; vol. 23; Elsevier Science Ltd.
Robak et al.; "Enhancement of latent heat energy storage using embedded heat pipes"; International Journal of Heat and Mass Transfer; 2011; pp. 3476-3483; vol. 54; Elsevier Ltd.
Rodríguez et al.; "Development and experimental validation of a computational model in order to simulate ice cube production in a thermoelectric ice maker"; Applied Thermal Engineering; 2009; one cover page and pp. 1-28; doi: 10.1016/j.applthermaleng.2009.03.005.
Russel et al.; "Characterization of a thermoelectric cooler based thermal management system under different operating conditions"; Applied Thermal Engineering; 2012; two cover pages and pp. 1-29; doi: 10.1016/j.applthermaleng.2012.05.002.
Sharifi et al.; "Heat pipe-assisted melting of a phase change material"; International Journal of Heat and Mass Transfer; 2012; pp. 3458-3469; vol. 55; Elsevier Ltd.
Stampa et al.; "Numerical Study of Ice Layer Growth Around a Vertical Tube"; Engenharia Térmica (Thermal Engineering); Oct. 2005; pp. 138-144; vol. 4, No. 2.
Vián et al.; "Development of a thermoelectric refrigerator with two-phase thermosyphons and capillary lift"; Applied Thermal Engineering; 2008; one cover pages and pp. 1-16 doi: 10.1016/j.applthermaleng.2008.09.018.
Ye et al.; "Evaluation of Electrical Capacitance Tomography Sensors for Concentric Annulus"; IEEE Sensors Journal; Feb. 2013; pp. 446-456; vol. 13, No. 2; IEEE.
Yu et al.; "Comparison Study of Three Common Technologies for Freezing-Thawing Measurement"; Advances in Civil Engineering; 2010; pp. 1-10; doi: 10.1155/2010/239651.

* cited by examiner

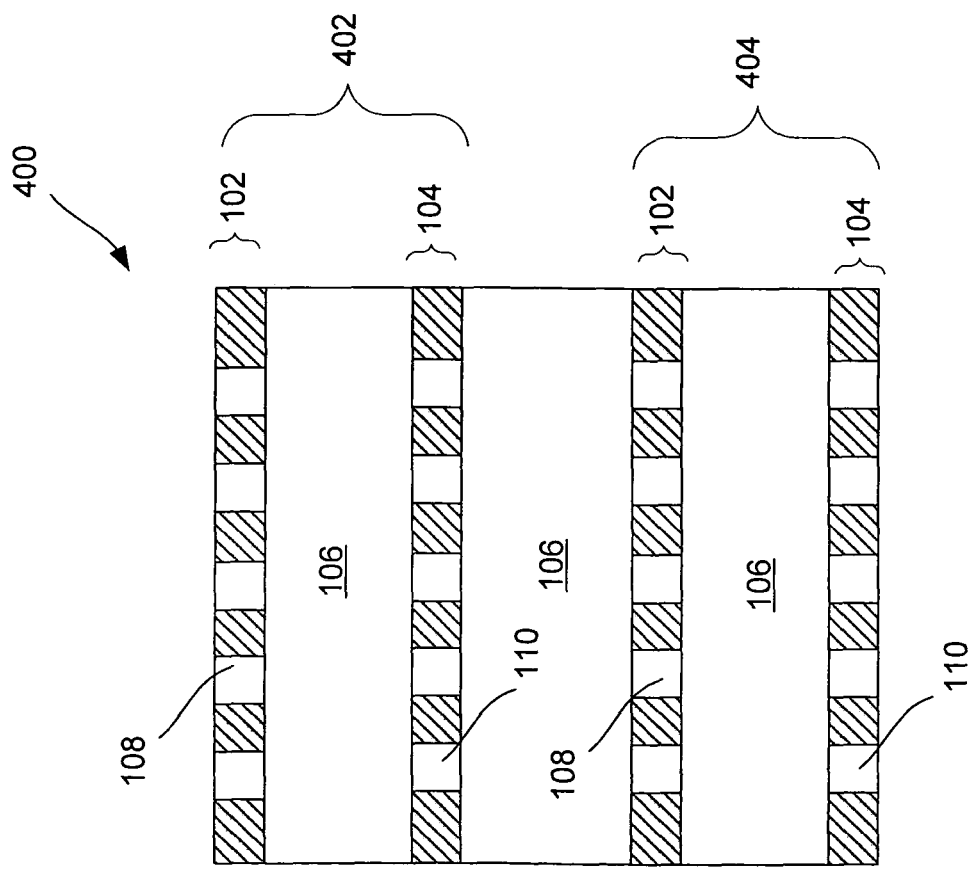

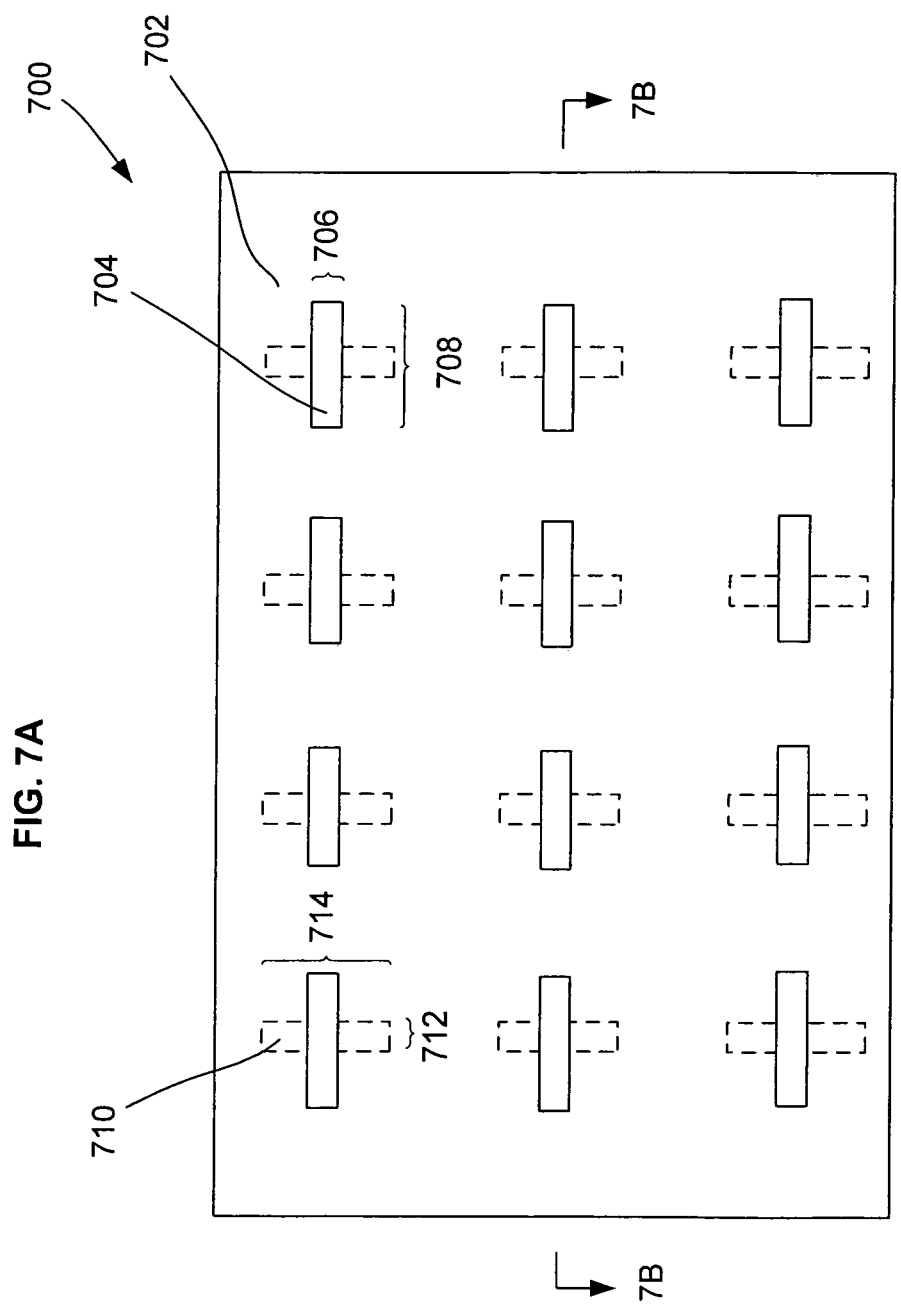

MULTI-LAYER INSULATION COMPOSITE MATERIAL HAVING AT LEAST ONE THERMALLY-REFLECTIVE LAYER WITH THROUGH OPENINGS, STORAGE CONTAINER USING THE SAME, AND RELATED METHODS

CROSS-REFERENCE TO RELATED APPLICATIONS

The present application is related to U.S. patent application Ser. No. 12/152,467 entitled MULTI-LAYER INSULATION COMPOSITE MATERIAL INCLUDING BANDGAP MATERIAL, STORAGE CONTAINER USING SAME, AND RELATED METHODS, naming Jeffrey A. Bowers, Roderick A. Hyde, Muriel Y. Ishikawa, Edward K. Y. Jung, Jordin T. Kare, Eric C. Leuthardt, Nathan P. Myhrvold, Thomas J. Nugent Jr., Clarence T. Tegreene, Charles Whitmer, and Lowell L. Wood Jr. as inventors, filed on May 13, 2008, and incorporated herein by this reference in its entirety.

The present application is related to U.S. patent application Ser. No. 12/152,465 entitled STORAGE CONTAINER INCLUDING MULTI-LAYER INSULATION COMPOSITE MATERIAL HAVING BANDGAP MATERIAL AND RELATED METHODS, naming Jeffrey A. Bowers, Roderick A. Hyde, Muriel Y. Ishikawa, Edward K. Y. Jung, Jordin T. Kare, Eric C. Leuthardt, Nathan P. Myhrvold, Thomas J. Nugent Jr., Clarence T. Tegreene, Charles Whitmer, and Lowell L. Wood Jr. as inventors, filed on May 13, 2008, and incorporated herein by this reference in its entirety.

The present application is related to U.S. patent application Ser. No. 12/001,757 entitled TEMPERATURE-STABILIZED STORAGE CONTAINERS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Dec. 11, 2007, and incorporated herein by this reference in its entirety.

The present application is related to U.S. patent application Ser. No. 12/008,695 entitled TEMPERATURE-STABILIZED STORAGE CONTAINERS FOR MEDICINALS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Jan. 10, 2008, and incorporated herein by this reference in its entirety.

The present application is related to U.S. patent application Ser. No. 12/006,089 entitled TEMPERATURE-STABILIZED STORAGE SYSTEMS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Dec. 27, 2007, and incorporated herein by this reference in its entirety.

The present application is related to U.S. patent application Ser. No. 12/006,088 entitled TEMPERATURE-STABILIZED STORAGE CONTAINERS WITH DIRECTED ACCESS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Dec. 27, 2007, and incorporated herein by this reference in its entirety.

The present application is related to U.S. patent application Ser. No. 12/012,490 entitled METHODS OF MANUFACTURING TEMPERATURE-STABILIZED STORAGE CONTAINERS, naming Roderick A. Hyde, Edward K. Y. Jung, Nathan P. Myhrvold, Clarence T. Tegreene, William H. Gates, III, Charles Whitmer, and Lowell L. Wood, Jr. as inventors, filed on Jan. 31, 2008, and incorporated herein by this reference in its entirety.

The present application is related to U.S. patent application Ser. No. 12/077,322 entitled TEMPERATURE-STABILIZED MEDICINAL STORAGE SYSTEMS, naming Roderick A. Hyde, Edward K. Y. Jung, Nathan P. Myhrvold, Clarence T. Tegreene, William Gates, Charles Whitmer, and Lowell L. Wood, Jr. as inventors, filed on Mar. 17, 2008, and incorporated herein by this reference in its entirety.

SUMMARY

In an embodiment, a multi-layer insulation (MLI) composite material includes a first thermally-reflective layer and a second thermally-reflective layer spaced from the first thermally-reflective layer. At least one of the first or second thermally-reflective layers includes a plurality of through openings configured to at least partially obstruct transmission therethrough of infrared electromagnetic radiation (EMR) having a wavelength greater than a threshold wavelength. A region between the first and second thermally-reflective layers substantially impedes heat conduction between the first and second thermally-reflective layers.

In an embodiment, a storage container includes a container structure defining at least one storage chamber. The container structure includes MLI composite material having at least one thermally-reflective layer including a plurality of through openings configured to at least partially obstruct transmission therethrough of infrared electromagnetic radiation having a wavelength greater than a threshold wavelength.

In an embodiment, a method includes at least partially enclosing an object with MLI composite material to insulate the object from an external environment. MLI composite material includes at least one thermally-reflective layer having a plurality of through openings configured to at least partially obstruct transmission therethrough of infrared electromagnetic radiation having a wavelength greater than a threshold wavelength.

The foregoing is a summary and thus may contain simplifications, generalizations, inclusions, and/or omissions of detail; consequently, the reader will appreciate that the summary is illustrative only and is NOT intended to be in any way limiting. Other aspects, features, and advantages of the devices and/or processes and/or other subject matter described herein will become apparent after reading the teachings set forth herein.

BRIEF DESCRIPTION OF THE FIGURES

FIG. 4 is a partial cross-sectional view of an embodiment of an MLI composite material including two or more of the MLI composite materials shown in FIG. 1 stacked together.

FIG. 7A is a top plan view of an embodiment of an MLI composite material including a first thermally-reflective layer having a first plurality of elongated through slots and a second thermally-reflective layer having a second plurality of elongated through slots that are oriented in a different direction than the first plurality of elongated through slots.

DETAILED DESCRIPTION

Figure 1:
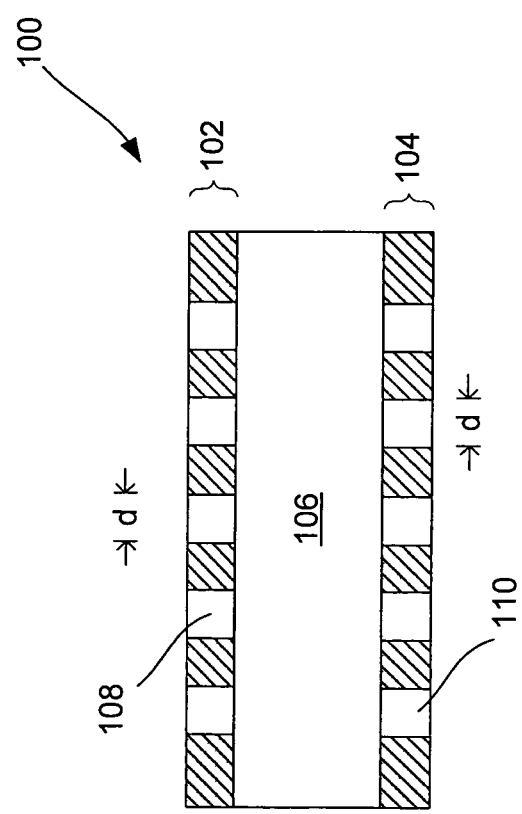
FIG. 1 is a partial cross-sectional view of an embodiment of an MLI composite material, which includes at least one thermally-reflective layer having a plurality of through openings configured to reflect infrared EMR.
Figure 2:
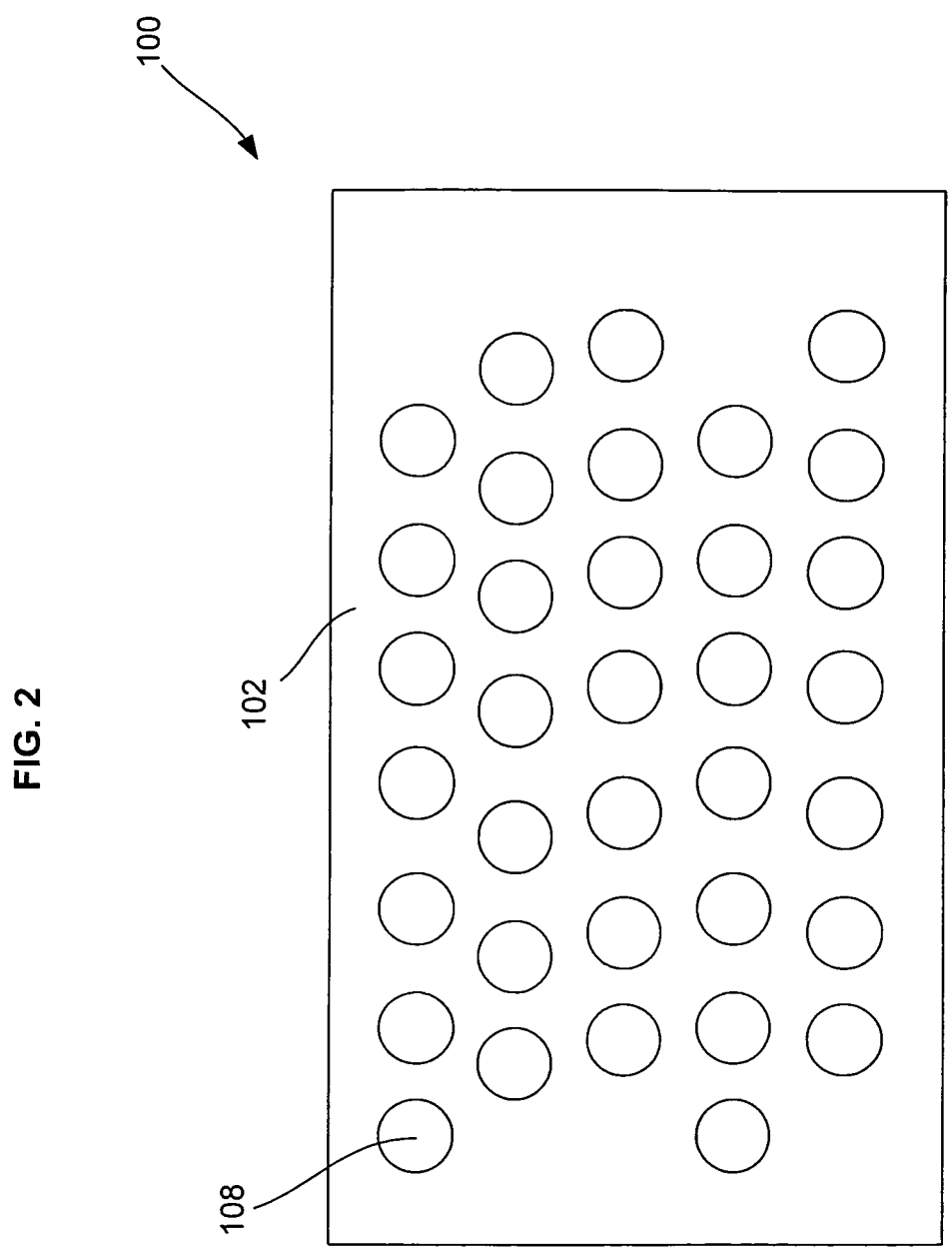
FIG. 2 is a top plan view of the first thermally-reflective layer of the MLI composite material shown in FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

FIG. 1 is a partial cross-sectional view of an embodiment of an MLI composite material 100, which includes at least one thermally-reflective layer having a plurality of through openings configured to reflect infrared EMR. The MLI composite material 100 includes a first thermally-reflective layer 102 spaced from a second thermally-reflective layer 104. A region 106 is located between the first and second thermally-reflective layers 102 and 104, and impedes heat conduction between the first and second thermally-reflective layers 102 and 104. As discussed in further detail below, the first and second thermally-reflective layers 102 and 104 have relatively low emissivities in order to inhibit radiative heat transfer, and the region 106 functions to inhibit conductive and convective heat transfer between the first and second thermally-reflective layers 102 and 104 so that the MLI composite material 100 is thermally insulating.

The first and second thermally-reflective layers 102 and 104 may be spaced from each other using, for example, low thermal conductivity spacers that join the first and second thermally-reflective layers 102 and 104 together, electro-static repulsion, or magnetic repulsion. For example, electrical potentials may be applied to the first and second thermally-reflective layers 102 and 104 via electrical circuitry and maintained to provide a controlled electro-static repulsive force, or the first and second thermally-reflective layers 102 and 104 may each include one or more magnetic or electromagnetic elements embedded therein or otherwise associated therewith to provide a magnetic repulsive force.

The first thermally-reflective layer 102, second thermally-reflective layer 104, or both may include a plurality of through openings configured to at least partially obstruct infrared EMR having a wavelength greater than a threshold wavelength. For example, in the illustrated embodiment, the first thermally-reflective layer 102 includes a first plurality of through openings 108 that extend completely through a thickness of the first thermally-reflective layer 102, and the second thermally-reflective layer 104 also includes a second plurality of through openings 110 that extend completely through a thickness of the second thermally-reflective layer 104 and in substantial registry with the first plurality of openings 108. Respective through openings 108 and 110 may have a lateral opening dimension d (e.g., a diameter) proportional to a selected threshold wavelength. Infrared EMR having a wavelength greater than the threshold wavelength may be at least partially obstructed by the first and second plurality of through openings 108 and 110. Thus, the lateral opening dimension d defines, in part, the threshold wavelength, and infrared EMR having a wavelength greater than that of the threshold wavelength may be reflected from the first and second thermally-reflective layers 102 and 104. The threshold wavelength is a function of the lateral opening dimension d and may be proportional to the lateral opening dimension d. For example, the threshold wavelength may be equal to n·d, where n is a constant that may be approximately two.

The lateral opening dimension d may exhibit a magnitude falling within the thermal infrared EMR spectrum, which is of most interest to be reflected by the MLI material 100 to provide an efficient insulation material. For example, the lateral opening dimension d may be about 1 μm to about 15 μm (e.g., about 8 μm to about 12 μm) so that transmission of infrared EMR through the MLI composite material 100 having a wavelength greater than about 1 μm to about 15 μm (e.g., about 8 μm to about 12 μm) may be at least partially obstructed. Although respective through openings 108 and 110 are illustrated as being cylindrical in configuration, other configurations may be used, such as a rectangular geometry. Additionally, although in the illustrated embodiment, the through openings 108 and 110 are substantially in registry, in other embodiments, the through openings 108 and 110 may be at least partially out of registry.

In addition to the MLI composite material 100 being configured to at least partially obstruct infrared EMR having a wavelength greater than the threshold wavelength, the magnitude of the lateral dimension d is sufficiently large to allow visible EMR (e.g., about 400 nm to about 700 nm) to be transmitted therethrough over at least part of or substantially all of the visible EMR spectrum. Thus, the first and second plurality of through openings 108 and 110 may be configured to allow transmission of visible EMR therethough so that the MLI composite material 100 is at least partially transparent. Accordingly, when the MLI composite material 100 is disposed in front of an object, the object may be at least partially visible through the various layers of the MLI composite material 100.

In the illustrated embodiment, the first and second plurality of through openings 108 and 110 may be arranged in a substantially non-periodic pattern to minimize diffraction effects of EMR incident on the first and second thermally-reflective layers 102 and 104. In other embodiments, the first and second plurality of through openings 108 and 110 may be arranged in a substantially periodic pattern.

The first and second thermally-reflective layers 102 and 104 may be formed from a variety of different materials, such as an electrically conductive metallic material, an electrically conductive doped semiconductor material, a dielectric material, or an infrared-reflective coating (e.g., an infrared-reflective paint). In an embodiment, the first or second thermally-reflective layers 102 and 104 may be formed from an electrically conductive metallic layer or a doped semiconductor material that is patterned using photolithography or electron-beam lithography and etched to form the through openings 108 or 110 therein. In another embodiment, the first and second thermally-reflective layers 102 or 104 may be formed from dielectric layer that is patterned using a photolithography process or an electron-beam lithography process and etched to define the through openings 108 and 110 therethrough. For example, the dielectric layer may comprise a dielectric material that is substantially transparent to visible EMR, such as a silica-based glass.

Figure 3A:
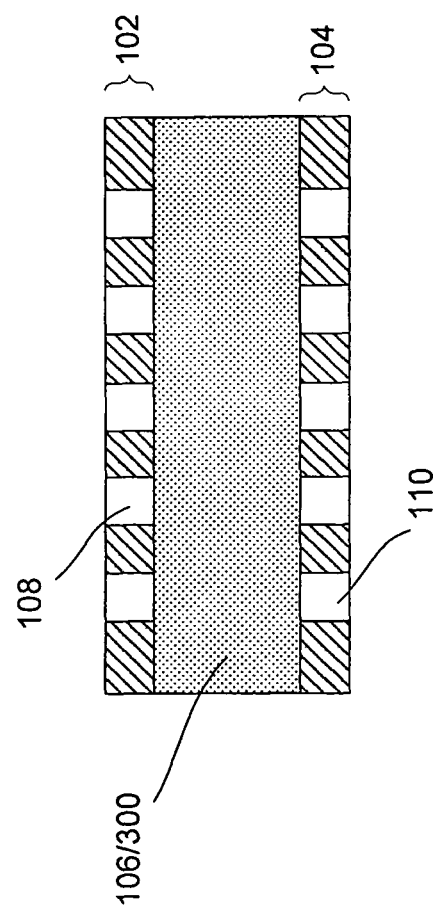
FIG. 3A is a partial cross-sectional view of the MLI composite material shown in FIG. 1, with a region between the first and second thermally-reflective layers including aerogel particles, according to an embodiment.
Figure 3B:
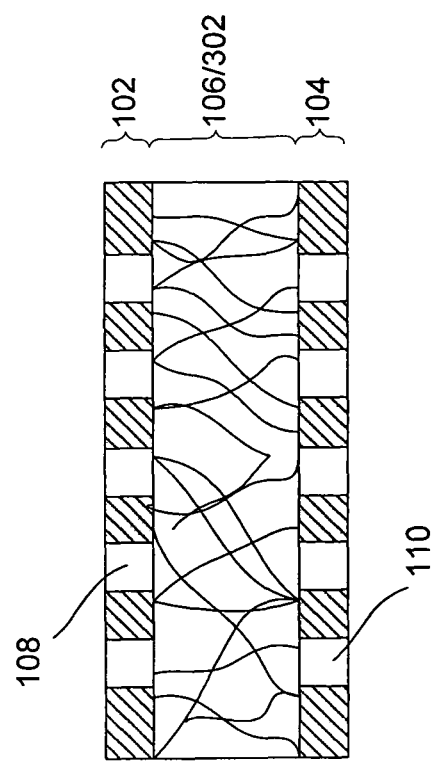
FIG. 3B is a partial cross-sectional view of the MLI composite material shown in FIG. 1, with a region between the first and second thermally-reflective layers including a mass of fibers, according to an embodiment.

As discussed above, the region 106 impedes heat conduction between the first and second thermally-reflective layers 102 and 104. In some embodiments, the region 106 may be at least partially or substantially filled with at least one low-thermal conductivity material. Referring to FIG. 3A, in an embodiment, the region 106 may include a mass 300 of aerogel particles or other type of material that at least partially or substantially fills the region 106. For example, the aerogel particles may comprise silica aerogel particles having a density of about 0.05 to about 0.15 grams per $cm^3$, organic aerogel particles, or other suitable types of aerogel particles. Referring to FIG. 3B, in an embodiment, the region 106 may include a mass 302 of fibers that at least partially or substantially fills the region 106. For example, the mass 302 of fibers or foam may comprise a mass of alumina fibers, a mass of silica fibers, or any other suitable mass of fibers.

In an embodiment, instead of filling the region 106 between the first and second thermally-reflective layers 102 and 104 with a low thermal conductivity material, the region 106 may be at least partially evacuated to reduce heat conduction and convection between the first and second thermally-reflective layers 102 and 104.

Referring to FIG. 4, according to an embodiment, an MLI composite material 400 may be formed from two or more sections of the MLI composite material 100 to enhance insulation performance. For example, the MLI composite material 400 includes a section 402 made from the MLI composite material 100 assembled with a section 404 that is also made from the MLI composite material 100. Although only two sections of the MLI composite material 100 are shown, other embodiments may include three or more sections of the MLI composite material 100. Typical embodiments of the MLI composite material 400 may include, for example, twenty or more sections of the MLI composite material 100, with insulation efficiency increasing with an increased number of such sections.

Figure 5:
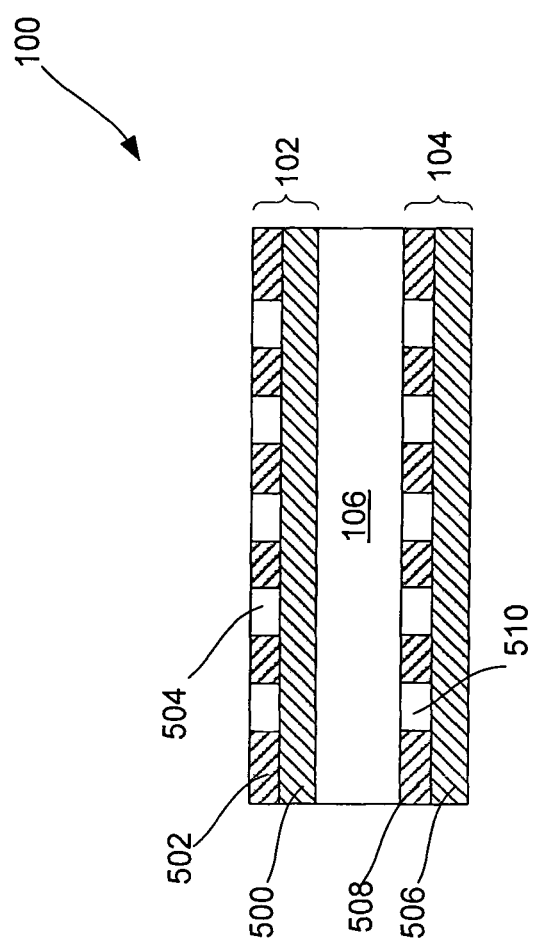
FIG. 5 is a partial cross-sectional view of the MLI composite material shown in FIG. 1 in which the first thermally-reflective layer includes a substrate on which a first layer having through openings is disposed and the second thermally-reflective layer includes a substrate on which a second layer having through openings is disposed according to an embodiment.

Referring to FIG. 5, in some embodiments, the first and second thermally-reflective layers 102 and 104 may include respective layers having a plurality of through openings therein configured to at least partially reflect infrared EMR. FIG. 5 is a partial cross-sectional view of the MLI composite material 100 shown in FIG. 1 in which the first thermally-reflective layer 102 includes a substrate 500 on which a first layer of material 502 having a first plurality of through openings 504 is disposed and the second thermally-reflective layer 104 includes a substrate 506 on which a second layer of material 508 having a second plurality of through openings 510 is disposed. The substrates 500 and 506 may each comprise a rigid inorganic substrate (e.g., a silicon substrate) or a flexible, polymeric substrate (e.g., made from Teflon®, Mylar®, Kapton®, etc.). Forming the substrates 500 and 506 from a flexible, polymeric material and forming the first and second layers of material 502 and 508 sufficiently thin enables the MLI composite material 100 to be sufficiently flexible to be wrapped around a structure as insulation.

In the illustrated embodiment, the substrates 500 and 506 may be formed from a material that is substantially transparent to visible EMR. In other embodiments, the substrates 500 and 506 may each include through openings (not shown) that have about the same lateral dimension as the through openings 504 and 510 and generally in registry with the through openings 504 and 510.

The first and second layers of materials 502 and 508 may be selected from any of the previously described materials, such as a metallic material, a doped semiconductor material, a dielectric material, or an infrared-reflective coating. For example, in one embodiment, the first thermally-reflective layer 102 may be formed by depositing the first layer of material 502 onto the substrate 500 using a deposition technique (e.g., chemical vapor deposition (CVD), physical vapor deposition (PVD), or another suitable technique) followed by defining the first plurality of through holes using a suitable material removal technique. For example, the first plurality of through openings 504 may be formed using photolithography and etching, electron beam lithography and etching, nanoimprint lithography and etching, focused ion beam milling, or another suitable technique with a sufficient resolution to define feature sizes of about 1 μm to about 15 μm. The second thermally-reflective layer 508 and second plurality of through openings 510 may be formed using the same or similar technique as the first thermally-reflective layer 102.

In some embodiments, the first plurality of through openings 504 may be configured to reflect infrared EMR greater than a first threshold wavelength and the second plurality of through openings 510 may be configured to reflect infrared EMR greater than a second threshold wavelength. In such an embodiment, the MLI composite material 100 may be configured to block infrared EMR over a range of wavelengths that would be difficult to block using a single type of bandgap material.

Figure 6:
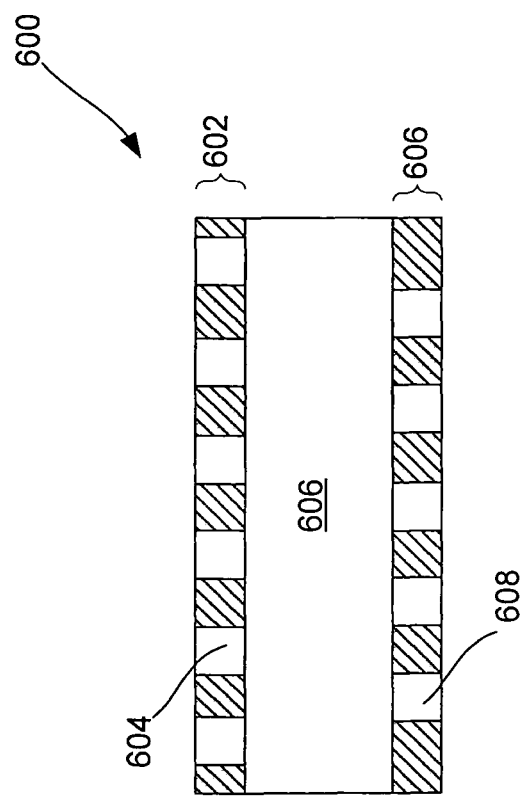
FIG. 6 is a partial cross-sectional view of an embodiment of an MLI composite material including a first thermally-reflective layer having a first plurality of through openings and a second thermally-reflective layer having a second plurality of through openings that are not in substantial registry with the first plurality of through openings.

FIG. 6 is a partial cross-sectional view of an embodiment of an MLI composite material 600 according to an embodiment. The MLI composite material 600 includes a first thermally-reflective layer 602 spaced from a second thermally-reflective layer 606, with a region 606 therebetween. The first thermally-reflective layer 602 includes a first plurality of through openings 604 configured to at least partially obstruct infrared EMR and the second thermally-reflective layer 606 includes a second plurality of through openings 608 configured to at least partially obstruct infrared EMR. The second plurality of through openings 608 are illustrated as being completely out of registry with the first plurality of through openings 604. However, in some embodiments, the first plurality of through openings 604 may be partially in registry with the second plurality of through openings 608 to still allow the MLI composite material 600 to be at least partially transparent to visible EMR.

Figure 7B:
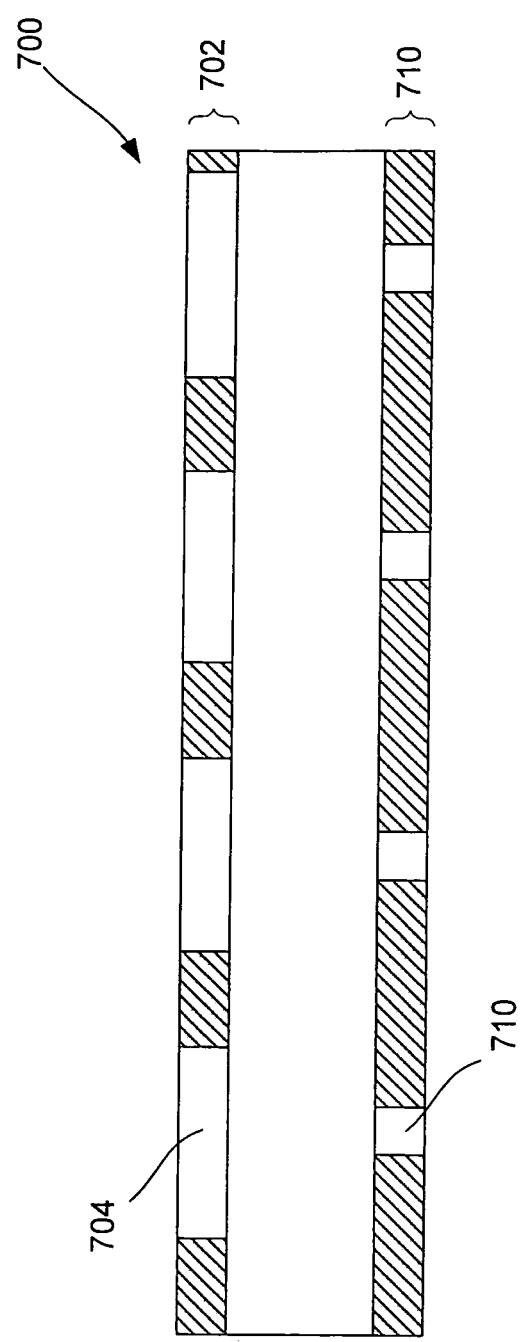
FIG. 7B is a cross-sectional view of the MLI composite material shown in FIG. 7A taken along line 7B-7B.

FIGS. 7A and 7B are top plan and cross-sectional views, respectively, of an embodiment of an MLI composite material 700 including one or more sets of elongated through slots configured to block infrared EMR having one or more selected polarization directions. The MLI composite material 700 includes a first thermally-reflective layer 702 having a first plurality of elongated through slots 704 defined by a respective width 706 and length 708. The MLI composite material 700 also includes a second thermally-reflective layer 710 (FIG. 7B) spaced from the first thermally-reflective layer 702 and having a second plurality of elongated through slots 710 with a width 712 and length 714. The second plurality of elongated through slots 710 may be overlapped by the first plurality of elongated through slots 704. Respective lengths 708 of the elongated through slots 704 are oriented in a different direction than respective lengths 714 of the elongated through slots 710. In the illustrated embodiment, the elongated through slots 704 are oriented generally perpendicular (i.e., a substantially different directional orientation) to the elongated through slots 710. However, in other embodiments, the elongated through slots 704 and elongated through slots 710 may be oriented at any other selected directional orientation including, but not limited to, the elongated through slots 704 and elongated through slots 710 being oriented in generally the same direction. Fabrication of the MLI composite material 700 may be relatively easier than, for example, the MLI composite material 100 due to employing one-dimensional-like elongated through slots as opposed to two-dimensional-type through openings such as circular holes.

Infrared EMR having a polarization direction generally perpendicular to the respective lengths 708 and 714 of the corresponding elongated through slots 704 and 710 and a wavelength greater than a threshold wavelength that is a function of the respective widths 706 and 712 is at least partially obstructed so that transmission through the elongated through slots 704 and 710 is reduced and, in some embodiments, substantially prevented. Infrared EMR having a polarization direction generally parallel to the respective lengths 708 and 714 of the corresponding elongated through slots 704 and 710 may be transmitted through the elongated through slots 704 and 710 regardless of the wavelength of the infrared EMR. Accordingly, infrared EMR having a polarization direction that allows transmission through the elongated through slots 704 may be at least partially obstructed by the elongated through slots 710 so that such infrared EMR is not transmitted completely through the MLI composite material 700.

In some embodiments, one or more thermally-reflective layers of a MLI composite material may include sets of elongated through slots, with the elongated through slots of each set oriented in different selected orientations. For example, at least one of the first thermally-reflective layer 702 or second thermally-reflective layer 710 may include the elongated through slots 704 and 710.

Figure 8:
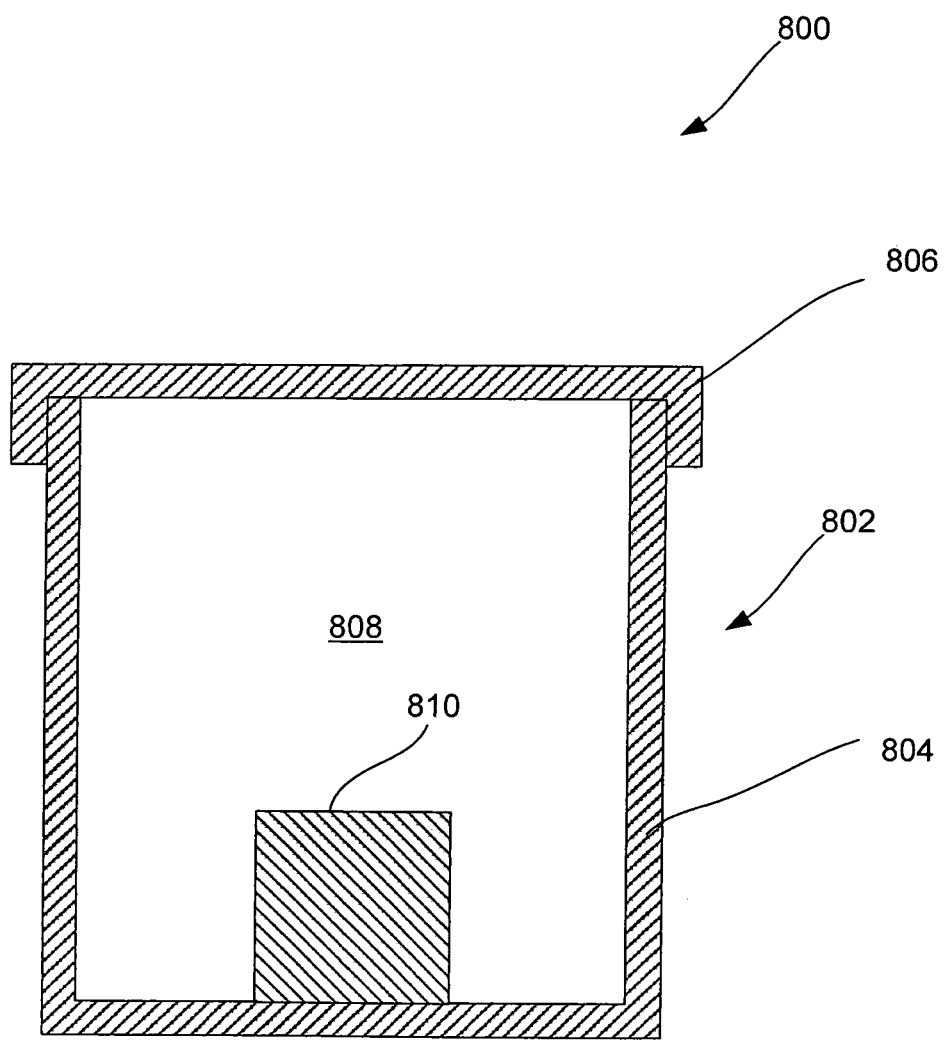
FIG. 8 is a cross-sectional view of an embodiment of storage container including a container structure formed at least partially from MLI composite material.
Figure 9:
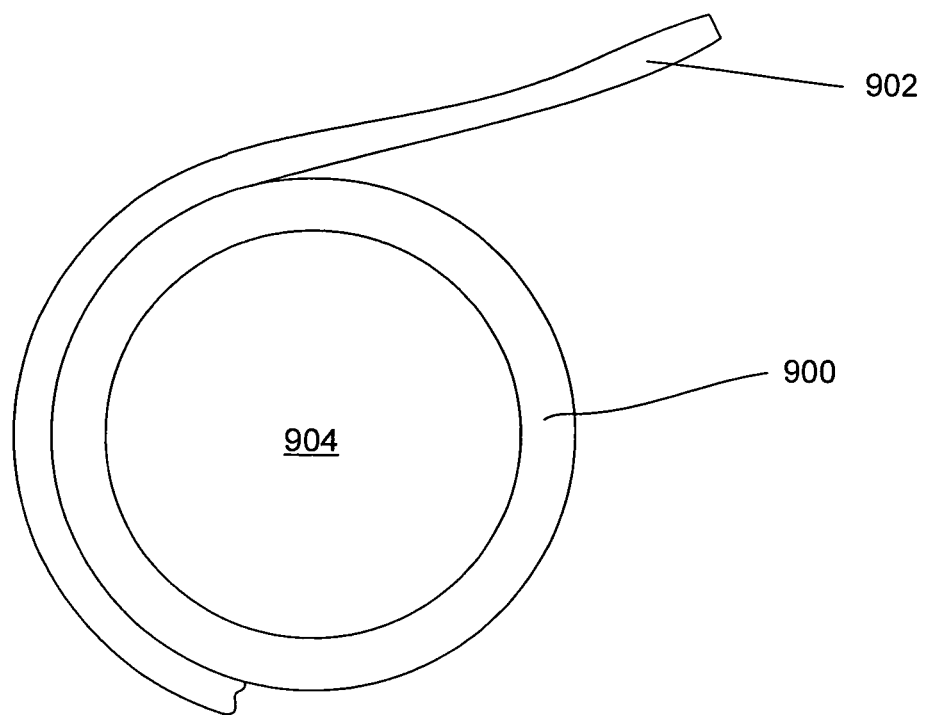
FIG. 9 is a partial side elevation view of a structure in the process of being wrapped with MLI composite material according to an embodiment.

FIGS. 8 and 9 illustrate some applications of the above-described MLI composite materials for maintaining an object for a period of time at a temperature different than the object's surrounding environment. For example, in applications (e.g., cryogenic applications or storing temperature-sensitive medicines), an object may be maintained at a temperature below that of the object's surroundings. In other applications (e.g., reducing heat-loss in piping, etc.), an object may be maintained at a temperature above that of the object's surroundings for a period of time.

FIG. 8 is a cross-sectional view of an embodiment of storage container 800 that employs at least one of the described MLI composite material embodiments. The storage container 800 includes a container structure 802, which may include a receptacle 804 and a lid 806 removably attached to the receptacle 804 that, together, forms a storage chamber 808. At least a portion of the receptacle 804 or lid 806 may comprise any of the described MLI composite material embodiments. Forming the container structure 802 at least partially or completely from the described MLI composite material embodiments provide a thermally-insulative structure for insulating an object 810 stored in the storage chamber 808 and enclosed by the container structure 802 from incident infrared EMR received from the storage container's 800 surrounding environment, while still allowing the object 810 to be at least partially visible through the section of the container structure 802 made from the MLI composite material. In some embodiments, the container structure 802 may be fabricated by assembling sections of MLI composite material together.

In some embodiments, the container structure 802 may include one or more interlocks configured to provide controllable ingress of the object 810 into the storage chamber 808 or egress of the object 810 stored in the storage chamber 808 from the container structure 802. The one or more interlocks may enable inserting the object 810 into the storage chamber 808 or removing the object 810 from the storage chamber 808 without allowing the temperature of the storage chamber 808 to significantly change. In some embodiments, the container structure 802 may include two or more storage chambers, and the one or more interlocks enable removal an object from one storage chamber without disturbing the contents in another chamber. Similarly, the one or more interlocks may enable insertion of an object into one storage chamber without disturbing the contents of another storage chamber. For example, the one or more interlocks may allow ingress or egress of an object through a network of passageways of the container structure 802, with the one or more interlocks being manually or automatically actuated.

FIG. 9 is a partial side elevation view of a structure 900 in the process of being wrapped with flexible MLI composite material 902 according to an embodiment. For example, the flexible MLI composite material 902 may employ a flexible, polymeric substrate on which one or more layers of material is disposed, such as illustrated in the embodiment shown in FIG. 5. The structure 900 may be configured as a pipe having a passageway 904 therethrough, a cryogenic tank, a container, or any other structure desired to be insulated. The structure 900 may be at least partially or completely enclosed by wrapping the flexible, MLI composite material 902 manually or using an automated, mechanized process to insulate the structure 900 from the surrounding environment, while still allowing the structure 900 to be at least partially visible through the MLI composite material 902.

In a general sense, the various embodiments described herein can be implemented, individually and/or collectively, by various types of electro-mechanical systems having a wide range of electrical components such as hardware, software, firmware, or virtually any combination thereof, and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The herein described components (e.g., steps), devices, and objects and the discussion accompanying them are used as examples for the sake of conceptual clarity. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." The reader will recognize that "configured to" can generally encompass active-state components and/or inactive-state components and/or standby-state components, etc. unless context requires otherwise.

In some instances, one or more components may be referred to herein as "configured to." The reader will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

With respect to the appended claims, the recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, the various aspects and embodiments disclosed herein are for purposes of illustration and are not intended to be limiting, with the true scope and spirit being indicated by the following claims.

The invention claimed is:

1. A storage container, comprising:
a container structure defining at least one storage chamber, the container structure at least partially transparent to visible electromagnetic radiation so that an object stored in the at least one storage chamber is at least partially visible through the container structure, the container structure including multi-layer insulation (MLI) composite material having first and second thermally-reflective layers, with a region between the first and second thermally-reflective layers that impedes heat conduction therebetween, at least one of the first or second thermally-reflective layers including a plurality of through openings, at least some of the plurality of through openings having a lateral opening dimension and being configured to,
at least partially obstruct transmission therethrough of infrared electromagnetic radiation having a wavelength greater than a threshold wavelength, wherein the lateral opening dimension is proportional to the threshold wavelength; and
at least partially allow transmission therethrough of the visible electromagnetic radiation.

2. The storage container of claim 1, wherein the plurality of through openings are arranged in a substantially periodic pattern.

3. The storage container of claim 1, wherein the plurality of through openings are arranged in a substantially non-periodic pattern.

4. The storage container of claim 1, wherein:
the plurality of through openings include a first plurality of through openings and a second plurality of through openings; and
the first thermally-reflective layer includes the first plurality of through openings, and the second thermally-reflective layer includes the second plurality of through openings which are not positioned in substantial registry with the first plurality of through openings.

5. The storage container of claim 1, wherein:
the plurality of through openings include a first plurality of through openings and a second plurality of through openings; and
the first thermally-reflective layer includes the first plurality of through openings, and the second thermally-reflective layer includes the second plurality of through openings which are positioned in substantial registry with the first plurality of through openings.

6. The storage container of claim 1, wherein the threshold wavelength is related to an opening dimension of at least a portion of the plurality of through openings.

7. The storage container of claim 1, wherein the threshold wavelength is proportional to an opening dimension of at least a portion of the plurality of through openings.

8. The storage container of claim 1, wherein the threshold wavelength is about twice the lateral opening dimension.

9. The storage container of claim 1, wherein the plurality of through openings are configured to at least partially allow transmission therethrough of the visible electromagnetic radiation over substantially the entire visible electromagnetic radiation spectrum.

10. The storage container of claim 1, wherein the plurality of through openings are configured to at least partially allow transmission therethrough of the visible electromagnetic radiation over only part of the visible electromagnetic radiation spectrum.

11. The storage container of claim 1, wherein the threshold wavelength is from about 1 μm to about 15 μm.

12. The storage container of claim 11, wherein the threshold wavelength is from about 8 μm to about 12 μm.

13. The storage container of claim 1, wherein the first and second thermally-reflective layers are spaced from each other by an electrostatic repulsive force.

14. The storage container of claim 1, wherein the first and second thermally-reflective layers are spaced from each other by a magnetic repulsive force.

15. The storage container of claim 1, wherein the first and second thermally-reflective layers are spaced from each other by spacer elements.

16. The storage container of claim 1, wherein the region includes at least one low-thermal conductivity material selected from the group consisting of an aerogel, a foam, and a mass of fibers.

17. The storage container of claim 1, wherein the at least one of the first or second thermally-reflective layers includes a substrate on which at least one layer is disposed.

18. The storage container of claim 17, wherein the substrate comprises an inorganic substrate.

19. The storage container of claim 17, wherein the substrate comprises a flexible, polymeric substrate.

20. The storage container of claim 17, wherein at least one of the first or second thermally-reflective layers of the MLI composite material includes a metallic layer, a doped semiconductor layer, a photonic crystal layer, or an infrared-reflective coating.

21. The storage container of claim 1, wherein the at least one of the first or second thermally-reflective layers is electrically conductive.

22. The storage container of claim 1, wherein at least a portion of the through openings are generally elliptical slots.

23. The storage container of claim 1, wherein at least a portion of the plurality of through openings are configured to at least partially obstruct transmission of the infrared electromagnetic radiation therethrough having a selected polarization direction.

24. The storage container of claim 1, wherein:
the plurality of through openings include a first plurality of elongated through slots and a second plurality of elongated through slots; and
the first thermally-reflective layer includes the first plurality of elongated through slots and the second thermally-reflective layer includes the second plurality of elongated through slots oriented in substantially the same directional orientation as the first plurality of elongated through slots.

25. The storage container of claim 1, wherein:
the plurality of through openings include a first plurality of elongated through slots and a second plurality of elongated through slots; and
the first thermally-reflective layer includes the first plurality of elongated through slots and the second thermally-reflective layer includes plurality of elongated through slots oriented in a substantially different directional orientation than that of the first plurality of elongated through slots.

26. The storage container of claim 1, wherein the plurality of through openings include:
a first plurality of elongated through slots; and
a second plurality of elongated through slots oriented in substantially the same directional orientation as the first plurality of elongated through slots.

27. The storage container of claim 1, wherein the plurality of through openings include:
a first plurality of elongated through slots; and
a second plurality of elongated through slots oriented in a substantially different directional orientation than that of the first plurality of elongated through slots.

28. The storage container of claim 1, wherein the MLI composite material includes at least another thermally-reflective layer that is reflective to electromagnetic radiation that can damage a biological substance positioned within the at least one storage chamber.

29. The storage container of claim 1, wherein the MLI composite material forms at least part of a window in the container structure for viewing an object positioned in the at least one storage chamber.

30. The storage container of claim 1, wherein the MLI composite material forms substantially all of the container structure.

31. The storage container of claim 1, wherein the container structure includes:
a receptacle; and
a lid configured to be attached to the receptacle.

32. The storage container of claim 1, wherein the container structure is configured to provide controllable egress of an object stored in the at least one storage chamber.

* * * * *